United States Patent
Kuze et al.

[11] Patent Number: 5,922,826
[45] Date of Patent: Jul. 13, 1999

[54] PROCESS FOR PRODUCING POLYCARBONATE

[75] Inventors: Shigeki Kuze; Kenji Tanaka; Kouichi Suga; Yoshikatsu Seino; Akihiro Shishikura, all of Sodegaura; Noriyuki Kunishi, Ichihara, all of Japan

[73] Assignee: Idemitsu Kosan Co., Ltd., Tokyo, Japan

[21] Appl. No.: 08/875,402

[22] PCT Filed: Jan. 31, 1996

[86] PCT No.: PCT/JP96/00178

§ 371 Date: Jul. 31, 1997

§ 102(e) Date: Jul. 31, 1997

[87] PCT Pub. No.: WO96/23832

PCT Pub. Date: Aug. 8, 1996

[30] Foreign Application Priority Data

Jan. 31, 1995 [JP] Japan ................................. 7-014483
Jun. 26, 1995 [JP] Japan ................................. 7-159486

[51] Int. Cl.$^6$ .................................................. C08G 64/00
[52] U.S. Cl. ............................................ 528/196; 528/199
[58] Field of Search ................................. 528/196, 199

[56] References Cited

U.S. PATENT DOCUMENTS

| | | | |
|---|---|---|---|
| 3,442,854 | 5/1969 | Curtius et al. | 528/196 |
| 5,221,761 | 6/1993 | Jen et al. | 558/268 |
| 5,314,985 | 5/1994 | Kuehling et al. | 528/198 |
| 5,340,905 | 8/1994 | Kuehling et al. | 528/199 |
| 5,359,117 | 10/1994 | Totani et al. | 558/268 |
| 5,380,814 | 1/1995 | Totani et al. | 528/199 |
| 5,426,170 | 6/1995 | Hirao et al. | 528/198 |
| 5,466,774 | 11/1995 | Kanno et al. | 528/199 |

FOREIGN PATENT DOCUMENTS

| | | |
|---|---|---|
| 0 571 869 | 12/1993 | European Pat. Off. . |
| 0 608 778 | 8/1994 | European Pat. Off. . |
| 15 70 534 | 1/1970 | Germany . |
| 42 38 123 | 5/1994 | Germany . |
| 7-324128 | 12/1995 | Japan . |
| WO 90/07536 | 7/1990 | WIPO . |

*Primary Examiner*—Terressa Mosley
*Attorney, Agent, or Firm*—Oblon, Spivak, McClelland, Maier & Neustadt, P.C.

[57] ABSTRACT

There are disclosed a process for producing a polycarbonate through transesterification which comprises using, as a polymerization catalyst, (1) a combination of a nitrogen-containing organic basic compound and a quaternary phosphonium salt, (2) a tetraarylphosphonium salt having a specific chemical structure, or (3) a quaternary phosphonium salt having a specific chemical structure and containing a branched alkyl group; and a process for producing a polycarbonate which comprises the steps of preparing a polycarbonate prepolymer by preliminary polymerization and thereafter polymerizing the resultant prepolymer in a state of a solid phase by the use of a quaternary phosphonium salt as a catalyst.

By using any of these processes it is made possible to produce, in extremely high efficiency, a high-quality polycarbonate being excellent in appearance, heat resistance, hydrolysis resistance and the like.

21 Claims, 1 Drawing Sheet

PROCESS FOR PRODUCING POLYCARBONATE

TECHNICAL FIELD

The present invention relates to a process for producing a polycarbonate. More particularly, it pertains to a process for efficiently producing a high-quality polycarbonate in a short reaction time, by using a specific poymerization catalyst at the time of producing the polycarbonate by means of transesterification, for example, by means of transesterification using a dihydroxyl compound and a carbonic acid diester, or by polymerizing, in a state of a solid phase by using a specific catalyst, a polycarbonate prepolymer which is obtained by preliminary polymerization through transesterification or interfacial polycondensation.

BACKGROUND ART

A polycarbonate is an engineering plastics which is excellent in transparency, heat resistance or impact resistance, and is widely used at the present time in a variety of fields of electric/electronics, automobiles, optical parts, etc. and in other industrial fields.

As a process for producing the polycarbonate, various techniques are investigated, and there have heretofore been widely known a process in which an aromatic dihydroxyl compound is brought into direct reaction with phosgene (interfacial polycondensation process) and a process in which an aromatic dihydroxyl compound and a carbonic acid diester are subjected to transesterification in a molten state (melting polymerization process).

With regard to the interfacial polycondensation process in the processes for producing a polycarbonate, polymerization is carried out, while the resulting polymer is dissolved in a solvent, and therefore the viscosity of the solution is extremely increased when it is intended to produce an aromatic polycarbonate having a high degree of polymerization. Thus, much labor and a long time are required for the purification of the resultant polymer including cleaning, neutralization and the like; and besides the purification is prone to become insufficient, and the concentranted polymer solution is made pasty, thereby making it difficult to deal with, if the solvent is only removed by a conventional method such as heating or pressure reduction at the time of producing a polymer in solid form from the resultant polymer solution. The above-mentioned process, therefore, suffers a number of disadvantages, for example, there is required a complicated procedure of removing the solvent and precipitant which remain in the polymer after the polymer is precipitated by the addition of the precipitant. (Refer to Japanese Patent Publication No. 67394/1976 (Sho 51).)

On the other hand, the transesterification process (melting polymerization process) is advantageous in that it is free from the aforesaid problems with the interfacial polycondensation process, and is capable of producing a polycarbonate at a cost lower than that in the interfacial polycondensation process.

Nevertheless, the transesterification process suffers a serious drawback that the polycarbonate obtained thereby is inevitably colored because of the reaction for a long time at a temperature as high as 280 to 310° C. in usual cases. In addition, the process involves the problem that the polycarbonate obtained thereby is poor in resistance to hydrolysis as a result of the frequent use of a basic catalyst.

There are proposed, in order to solve the problems with the transesterification process (melting polymerization process), for example, a method in which a specific catalyst is employed (refer to Japanese Patent Publication No. 39972/1986 (Sho 61), Japanese Patent Application Laid-Open No. 223036/1988 (Sho 63), etc., a method in which an antioxidant is added to the reactant in the latter period of the reaction (refer to Japanese Patent Application Laid-Open Nos. 151236/1986 (Sho 61), 158719/1987 (Sho 62), etc., a method in which neutralization is performed with an acid such as p-toluenesulfonic acid and the excess acid is neutralized with an epoxy compound (refer to Japanese Patent Publication No. 175368/1992 (Hei 4), etc. However, the problem is not yet sufficiently solved.

Moreover, in order to solve the problem with the transesterification process (melting polymerization process) that this process fails to produce a high molecular weight product, there is proposed the use, in the latter period of the reaction, of a twin screw vent-type kneading extruder (refer to Japanese Patent Application Laid-Open No. 62522/1986 (Sho 61)) or a horizontal stirred polymerization vessel (refer to Japanese Patent Application Laid-Open No. 153925/1990 (Hei 2)). However, the problem is not yet sufficiently solved. There is also proposed a solid-phase polymerization process (refer to Japanese Patent Application Laid-Open No. 158033/1989 (Hei 1), Japanese Patent Publication No. 99553/1994 (Hei 6), etc.), which however, involve the problem that the process fails to improve the deterioration of the product quality due to the residual catalyst containing zinc acetate, tin acetate or the like to be used as a catalyst, and that, in the case where the polymerization is carried out in the absence of catalyst for the purpose of maintaining favorable quality of the product, the rate of reaction is extremely lowered.

DESCLOSURE OF THE INVENTION

It is an object of the present invention to provide a process for efficiently producing a polycarbonate which is excellent in quality through the solution to the problems with the conventional processes for producing a polycarbonate as described hereinbefore.

As a result of intensive research and investigation accumulated by the present inventors for the purpose of achieving the above-mentioned object, it has been found that the use of a specific catalyst in the case of carrying out transesterification by using a dihydroxyl compound and a carbonic acid dester, etc., makes it possible to maintain a sufficient catalytic activity from the initial stage of the transesterification to the latter stage thereof and to thermally decompose the catalyst in the last stage of the reaction without bringing about the deterioration of the polymer quality, thereby achieving the above-mentioned object. It has also been found that a polycarbonate excellent in quality is efficiently obtained in a short reaction time, thus achieving the object by polymerizing, in a state of a solid phase in the presence of specific catalyst, a polycarbonate prepolymer which is obtained by the preliminary polymerization through transesterification, interfacial polycondensation or the like. The present invention has been accomplished by the foregoing finding and information.

Specifically, the present invention provides:

(1) as the first aspect of the invention, a process for producing a polycarbonate which comprises using the combination of (a) a nitrogen-containing organic basic compound and (b) a quaternary phosphonium salt as a polymerization catalyst in the production of the polycarbonate by means of transesterification;

(2) as the second aspect of the invention, a process for producing a polycarbonate which comprises using, as a polymerization catalyst in the production of the polycarbonate by means of transesterification, a quaternary phosphonium salt represented by the general formula (III)

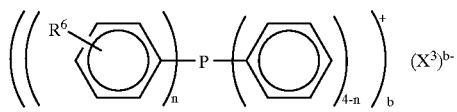

wherein $R^6$ is an organic group and when $R^6$-Ph (Ph is a phenyl group) is plural, each of $R^6$-Ph may be the same or different; $X^3$ is a halogen atom, hydroxyl group, alkyloxy group, aryloxy group, alkylcarbonyloxy group, arylcarbonyloxy group, $BR^7_4$ in which $R^7$ is a hydrogen atom or hydrocarbon group, and each of four $R^7$ may be the same or different, $HCO_3$ or $CO_3$; b is 2 when $X^3$ is $CO_3$, and is 1 when $X^3$ is other than $CO_3$; and n is an integer from 0 to 4;

(3) as the third aspect of the invention, a process for producing a polycarbonate which comprises using a quaternary phosphonium salt containing a branched alkyl group as a polymerization catalyst in the production of the polycarbonate by means of transesterification; and (4) as the fourth aspect of the invention, a process for producing a polycarbonate which comprises the steps of preparing a polycarbonate prepolymer by preliminary polymerization and thereafter polymerizing the resultant prepolymer in a state of a solid phase in the presence of a catalyst comprising a quaternary phosphonium salt.

THE MOST PREFERRED EMBODIMENT TO CARRY OUT THE INVENTION

Figure 1:
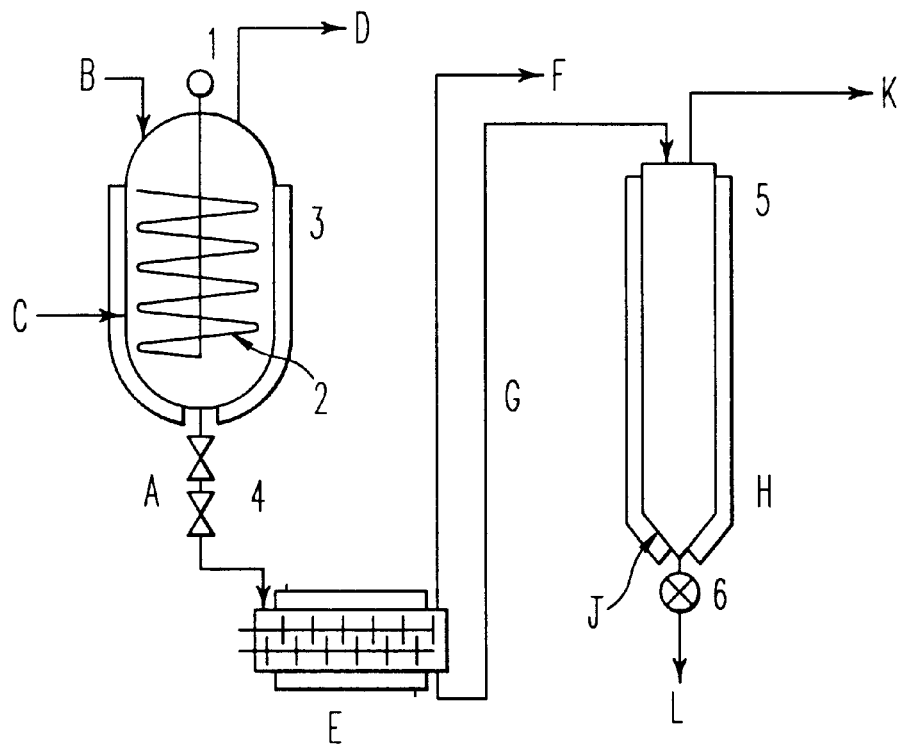
FIG. 1 is a schematic explanatory drawing showing an example of process for producing spherical prepolymer and continuously producing a polycarbonate through solid-phase polymerization by the use of the resultant prepolymer and FIG. 2 is an explanatory drawing showing an inclined cylindrical apparatus for testing the fluidity of powders, wherein the symbols represent the following items:
A Granulating vessel
B Solution of prepolymer in an organic solvent
C Crystallizing agent
D Organic solvent recovery step
E Predryer
F Organic solvent recovery step
G Spherical prepolmer
H Solid-phase polymerization reactor
J Nitrogen gas blowing-in port
K Nitrogen gas recovery step
L Polycarbonate
W Inclined cylindrical vessel
V Inclined cylindrical portion
X Discharge port
1 Stirrer
2 Stirring blade
3 Jack et for granulating vessel
4 Discharge valve for spherical prepolymer
5 Jacket for solid-phase polymerization reactor
6 Discharge valve for polycarbonate

In the first, second and third aspects of the present invention, a polycarbonate is produced by means of transesterification.

The starting raw material to be employed in the transesterification is not specifically limited, but may be any of various starting raw materials that are used for the production by conventional transesterification.

Examples of the starting raw materials in the transesterification include (1) Combination of a dihydroxyl compound as the component (A) and a carbonic acid diester as the component (B); (2) combination of a diester of a dihydroxyl compound as the component (A) and a carbonic acid diester as the component (B); (3) combination of a dicarbonic acid ester of a dihydroxyl compound as the component (A) and a carbonic acid diester as the component (B); (4) a dicarbonic acid ester of a dihydroxyl compound (self-condensation); (5) a monocarbonic acid ester of a dihydroxyl compound (self-transesterification) and the like.

Of these, the combination of a dihydroxyl compound as the component (A) and a carbonic acid diester as the component (B) [item (1)] is preferably used.

The dihydroxyl compound which is preferably used in the transesterification as the component (A) is at least one compound selected from its examples including aromatic dihydroxyl compounds and aliphatic dihydroxyl compounds.

The aromatic dihydroxyl compound to be used as the component (A) can be exemplified by the compound represented by the general formula (V)

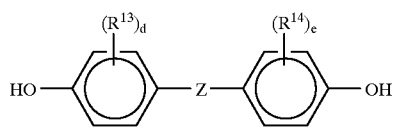

wherein $R^{13}$ and $R^{14}$ are each a halogen atom such as fluorine, chlorine, bromine and iodine, or an alkyl group having 1 to 8 carbon atoms such as methyl group, n-propyl group, isopropyl group, n-butyl group, isobutyl group, sec-butyl group, tert-butyl group, pentyl group, hexyl group, cyclohexyl group, heptyl group and octyl group, and may be same as or different from each other; a plurality of $R^{13}$, when being present, may be the same as or different from each other, and a plurality of $R^{14}$, when being present, may be the same as or different from each other; d and e are each an integer of 0 to 4; and Z is a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, —CO—, or a bond represented by the formula (VI) or (VI')

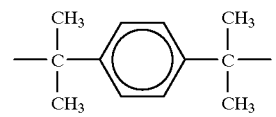

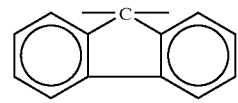

Examples of an alkylene group having 1 to 8 carbon atoms and an alkylidene group having 2 to 8 carbon atoms include a methylene group, ethylene group, propylene group, butylene group, pentylene group, hexylene group, ethylidene group and isopropylidene group. Examples of an cycloalkylene group having 5 to 15 carbon atoms and a cycloalkylidene group having 5 to 15 carbon atoms include a cyclopentyl group, cyclohexylene group, cyclopentylidene group and cyclohexylidene group.

Examples of the aromatic dihydroxyl compound represented by the general formula (V) include bis(hydroxyaryl) alkanes such as bis(4-hydroxyphenyl)methane; bis(3-methyl-4-hydroxyphenyl)methane; bis(3-chloro-4-hydroxyphenyl)methane; bis(3,5-dibromo-4-hydroxyphenyl)methane; 1-1-bis(4-hydroxyphenyl)ethane; 1-1-bis(2-tert-butyl-4-hydroxy-3-methylphenyl)ethane; 1,1-bis(2-tert-butyl-4-hydroxy-3methylphenyl)ethane; 1-phenyl-1,1-bis(3-fluoro-4-hydroxy-3-methylphenyl) ethane; 2-2-bis(4-hydroxyphenyl)propane (usually called bisphenol A); 2,2-bis(3-methyl-4-hydroxyphenyl)propane; 2,2-bis(2-methyl-4-hydroxyphenyl)propane; 2,2-bis(3,5-dimethyl-4-hydroxyphenyl)propane; 1,1-bis(2-tert-butyl-4-hydroxy-5-methylphenyl)propane; 2,2-bis(3-chloro-4-hydroxyphenyl)propane; 2,2-bis(3-fluoro-4-hydroxyphenyl) propane; 2,2-bis(3-bromo-4-hydroxyphenyl)propane; 2,2-bis(3,5-difluoro-4-hydroxyphenyl)propane; 2,2-bis(3,5-dichloro-4-hydroxyphenyl)propane; 2,2-bis(3,5-dibromo-4-hydroxyphenyl)propane; 2,2-bis(4-hydroxyphenyl)butane; 2,2-bis(4-hydroxyphenyl)octane; 2,2-bis(4-hydroxyphenyl) phenylmethane; 2,2-bis(4-hydroxy-1-methylphenyl) propane; 1,1-bis(4-hydroxy-tert-butylphenyl)propane; 2,2-bis(4-hydroxy-3-bromophenyl)propane; 2,2-bis(4-hydroxy-3,5-dimethylphenyl)propane; 2,2-bis(4-hydroxy-3,5-dimethylphenyl)propane; 2,2-bis(4-hydroxy-3-chlorophenyl)propane; 2,2-bis(4-hydroxy-3,5-dichlorophenyl)propane; 2,2-bis(4-hydroxy-3,5-dibromophenyl)propane; 2,2-bis(4-hydroxy-3,5-dibromophenyl)propane; 2,2-bis(3-bromo-4-hydroxy-5-chlorophenyl)propane; 2,2-bis(3-phenyl-4-hydroxyphenyl) propane; 2,2-bis(4-hydroxyphenyl)butane; 2,2-bis(3-methyl-4-hydroxyphenyl)butane; 1,1-bis(2-butyl-4-hydroxy-5-methylphenyl)butane; 1,1-bis(2-tert-butyl-4-hydroxy-5-methylphenyl)butane; 1,1-bis(2-tert-butyl-4-hydroxy-5-methylphenyl)isobutane; 1,1-bis(2-tert-amyl-4-hydroxy-5-methylphenyl)butane; 2,2-bis(3,5-dichloro-4-hydroxyphenyl)butane; 2,2-bis(3,5-dibromo-4-hydrophenyl)butane; 4,4-bis(4-hydroxyphenyl)heptane; 1-1-bis(2-tert-butyl-4-hydroxy-5-methylphenyl)heptane; 2,2-bis(4-hydroxyphenyl)octane; and 1,1-(4-hydroxyphenyl)ethane, bis(hydroxyaryl)cycloalkanes such as 1,1-bis(4-hydroxyphenyl)cyclopentane; 1,1-bis(4-hydroxyphenyl)cyclohexane; 1,1-bis(3-methyl-4-hydroxyphenyl)cyclohexane; 1,1-bis(3-cyclohexyl-4-hydroxyphenyl)cyclohexane; 1,1-bis(3-phenyl-4-hydroxyphenyl)cyclohexane; and 1-1-bis(4-hydroxyphenyl)-3,5,5-trimethylcyclohexane, bis (hydroxyaryl) ethers such as bis(4-hydroxyphenyl) ether; and bis(4-hydroxy-3-methylphenyl) ether, bis(hydroxyaryl) sulfide such as bis(4-hydroxyphenyl) sulfide; and bis(3-methyl-4-hydroxyphenyl) sulfide, bis(hydroxyaryl) sulfoxide such as bis(hydroxyphenyl) sulfoxide; bis(3-methyl-4-hydroxyphenyl) sulfoxide; and bis(3-phenyl-4-hydroxyphenyl) sulfoxide, bis(hydroxyaryl) sulfones such as bis(4-hydroxyphenyl)sulfone, bis(3-methyl-4-hydroxyphenyl) sulfone; and bis(3-phenyl-4-hydroxyphenyl) sulfone, and dihydroxybiphenyl such as 4,4'-dihydroxybiphenyl; 4,4'-dihydroxy-2,2'-dimethylbiphenyl; 4,4'-dihydroxy-3,3'-dimethylbiphenyl; 4,4'-dihydroxy-3,3'-dicyclohexybiphenyl and 3,3'-difluoro-4,4'-dihydroxybiphenyl.

Examples of the aromatic dihydroxyl compounds other than those represented by the general formula (V) include dihydroxybenzenes and halogen- and/or -alkyl- substituted dihydroxybenzenes. Specific examples of these include resorcinol; 3-methylresorcinol; 3-ethylresorcinol; 3-propylresorcinol; 3-butylresorcinol; 3-tert-butylresorcinol; 3-phenylresorcinol; 3-cumylresorcinol; 2,3,4,6-tetrafluororesorcinol; 2,3,4,6-tetrabromoresorcinol; catechol; hydroquinone; 3-methylhydroquinone; 3-ethylhydroquinone; 3-propylhydroquinone; 3-butylhydroquinone; 3-tert-butylhydroquinone; 3-phenylhydroquinone; 3-cumylhydroquinone; 2,5-dichlorohydroquinone; 2,3,5,6-tetramethylhydroquinone; 2,3,5,6-tetra-tert-butylhydroquinone; 2,3,5,6-tetrafluorohydroquinone and 2,3,5,6-tetrabromohydroquinone.

A variety of compounds are available as aliphatic dihydroxyl compounds to be used as the component (A). Examples of these include butane-1,4-diol; 2,2-dimthylpropane-1,3-diol; hexane-1,6-diol; diethylene glycol; triethylene glycol, tetraethylene glycol; octaethylene glycol; dipropylene glycol; N-methyldiethanolamine; cyclohexane-1,3-diol; cyclohexane-1,4-diol; 1,4-dimethylolcyclohexane; p-xylylene glycol; 2,2-bis(4-hydroxycyclohexyl)propane; an adduct of a dihydric alcohol or dihydric phenol and ethylene oxide or propylene oxide, specifically exemplified by an adduct of bisphenol A and ethylene oxide, an adduct of tetrachlorobisphenol A and ethylene oxide and an adduct of tetrachlorohydroquinone and ethylene oxide.

At least one compound suitably selected from among the above-exemplified compound is used as the dihydroxyl compound of the component (A) in the preferable production process according to any of the first to third aspects of the present invention. Of these, bisphenol A as one of the aromatic dihydroxyl compounds is preferably used.

On the other hand, a variety of compounds are available as carbonic acid diesters to be used as the component (B) in the first to third aspects of the present invention. Examples of these include carbonate of a diaryl compound, carbonate of a dialkyl compound and carbonate of an alkylaryl compound, from wich at least one compound is selected for use.

The carbonate of a diaryl compound to be used as the component (B) is a compound represented by the general formula (VII)

(VII)

wherein $Ar^1$ and $Ar^2$ are each an aryl group, and may be the same as or different from each other, or is a compound represented by the general formula (VIII)

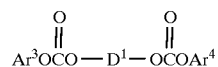
(VIII)

wherein $Ar^3$ and $Ar^4$ are each an aryl group, and may be the same as or different from each other, and $D^1$ is a residue obtained by removing two hydroxyl groups from the above-mentioned aromatic dihydroxyl compound.

The carbonate of a dialkyl compound is a compound represented by the general formula (IX)

(IX)

wherein $R^{15}$ and $R^{16}$ are each an alkyl group having 1 to 6 carbon atoms or a cycloalkyl group having 4 to 7 carbon atoms, and may be the same as or different from each other, or is a compound represented by the general formula (X)

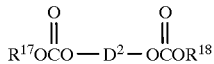
(X)

wherein $R^{17}$ and $R^{18}$ are each an alkyl group having 1 to 6 carbon atoms or a cycloalkyl group having 4 to 7 carbon atoms and may be the same as or different from each other, $D^2$ is a residue obtained by removing two hydroxyl groups from the above-mentioned aromatic dihydroxyl compound.

The carbonate of an alkylaryl compound is a compound represented by the general formula (XI)

(XI)

wherein $Ar^5$ is an aryl group and $R^{19}$ is an alkyl group having 1 to 6 carbon atoms or is a cycloalkyl group having 4 to 7 carbon atoms, or a compound represented by the general formula (XII)

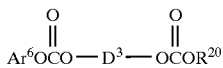
(XII)

wherein $Ar^6$ is an aryl group, $R^{20}$ is an alkyl group having 1 to 6 carbon atoms or a cycloalkyl group having 4 to 7 carbon atoms, and $D^3$ is a residue obtained by removing two hydroxyl groups from the above-mentioned aromatic dihydroxyl compound.

As the carbonate of a diaryl compound, mention is made, for example, of diphenyl carbonate, ditolyl carbonete, bis (chlorophenyl) carbonate, bis(m-cresyl) carbonate, dinaphthyl carbonate, bis(diphenyl) carbonate, and bisphenol A-bisphenyl carbonate.

As the carbonate of a dialkyl compound, mention is made, for example, of diethyl carbonate, dimethyl carbonate, dibutyl carbonate, dicyclohexyl carbonate, and bisphenol A/bis (methyl) carbonate.

As the carbonate of an alkylaryl compound, mention is made, for example, of methyl phenyl carbonate, ethyl phenyl carbonate, butyl phenyl carbonate, cyclohexyl phenyl carbonae and bisphenol A/methyl phenyl carbonate.

At least one compound suitably selected from among the above-exemplified compounds is used as the carbonic acid diester of the component (B) in any of the first to third aspects of the present invention. Of these, diphenyl carbonate is preferably used.

As a starting raw material which is used in any of the first to third aspects of the present invention and is other than the aforesaid dihydroxyl compound and carbonic acid diester, mention can be made, for example, of the following compounds: Specifically, diesters of the dihydroxyl compound are exemplified by diacetic acid esters of bisphenol A, dipropionic acid ester of bisphenol A, dibutyric acid ester of bisphenol A and dibenzoic acid ester of bisphenol A.

In addition, dicarbonic aicd esters of the dihydroxyl compound are exemplified by bismethyl carbonate of bisphenol A, bisethyl carbonate of bisphenol A and bisphenyl carbonate of bisphenol A.

Moreover, monocarbonic acid esters of the dihydroxyl compound are exemplified by monomethyl carbonate of bisphenol A, monoethyl carbonate of bisphenol A, monopropyl carbonate of bisphenol A and monophenyl carbonate of bisphenol A.

A terminal stopper can be used when necessary in the production process according to any of the first to third aspects of the present invention. Example of such terminal stopper incllude o-n-butylphenol, m-n-butylphenol, p-n-butylphenol, o-isobutylphenol, m-isobutylphenol, p-isobutylphenol, o-tert-butylphenol, m-tert-butylphenol, p-tert-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenyl. o-cumylphenol, m-cumylphenol, p-cumylphenol, o-naphthylphenol, m-naphthylphenol, p-naphthylphenol, 2,6-di-tert-butylphenol, 2,5-di-tert-butylphenol, 2,4-di-tert-butylphenol, 3,5-di-tert-butylphenol, 2,5-di-cumylphenol, 3,5-dicumylphenol, compounds represented by any of the following formulas:

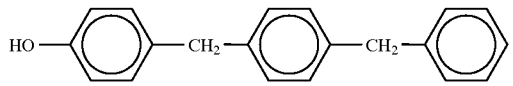

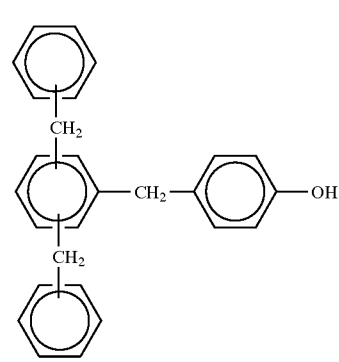

and monohydric phenols such as chroman derivatives represented by any of the following formulas:

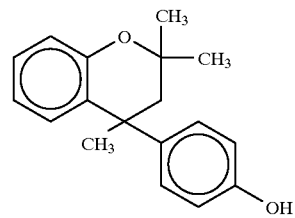

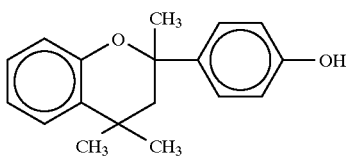

Among these phenols, p-tert-butylphenol, p-cumylphenol, and p-phenylphenol are preferable although the kind of the phenol is not particularly limited in the present invnetion.

Other usable examples include the compounds represented by any of the following formulas:

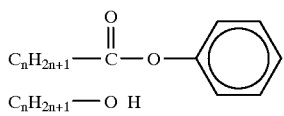

wherein n is an integer of 7 to 30.

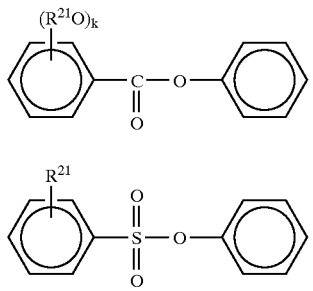

wherein $R^{21}$ is an alkyl group having 1 to 12 carbon atoms and k is an interger of 1 to 3.

In the present invention, a branching agent may be used when necessary, which is exemplified by phloroglucin; trimellitic acid; 1,1,1-tris(4-hydroxyphenyl)ethane; 1-[α-amethyl-α-(4'-hydroxyphenyl)ethyl]-4-[α', α'-bis(4'-hydroxyphenyl)ethyl]benzene; α,α',α"-tris(4-hydroxyphenyl)-1,3,5-triisopropylbenzene; and isatin bis(o-cresol).

To begin with the first aspect of the present invention, it is necessary in the transesterification to use as a polymerization catalyst, the combination of (a) a nitrogen-containing organic basic compound and (b) a quaternary phosphonium salt.

As the above-mentioned nitrogen-containing organic basic compound of the component (a), a variety of such compounds are available without specific limitation, and are exemplified by aliphatic tertiary amine compounds such as trimethylamine, triethylamine, tripropylamine, tributylamine, tripentylamine, trihexylamine and dimethylbenzylamine; dimethylaminopyridine such as N,N-dimethyl-4-aminopyridine; and nitrogen-containing heterocyclic compound such as 4-(diethylamino)pyridine, 4-pyrrolidinopyridine, 4-aminopyridine, 2-aminopyridine, 2-hydroxypyridine, 4-hydroxypyridine, 2-methoxypyridine, 4-methoxypyridine, imidazole, 2-methylimidazole, 4-methylimidzole, 2-dimethylaminoimidazole, 2-methoxyimidazole, 2-mercaptoimidazole, aminoquinoline, and diazabicyclooctane (DABCO).

In addition, mention may be made of quaternary ammonium salts represented by the general formula (I)

$$(NR^1_4)^+_z(X^L)^{z-} \qquad (I)$$

wherein $R^1$ is an organic group, for example, a straight-chain or a brached alkyl group or a cycloalkyl group such as methyl group, ethyl gorup, propyl group, butyl group, pentyl group, hexyl group, octyl group and cyclohexyl group, an aryl group with or without a substituent group, such as phenyl group, tolyl group, naphthyl group and biphenyl group, or an arylalkyl group with or without a substituent group, such as benzyl group, four $R^1$ may be the same as or different from each other, and two $R^1$ may combine with each other to form a ring; $X^1$ is a halogen atom, hydroxyl group, alkyloxy group, aryloxy group, alkylcarbonyloxy group, arylcarbonyloxy group, $HCO_3$, $CO_3$ or $BR^2_4$ wherein $R^2$ is a hydrogen atom or hydrocarbon group such as alkyl group or aryl group and four $R^2$ may be the same as or different from each other; and z is 2 in the case of $X^1$ being $CO_3$ and is 1 in the other cases.

Examples of such quaternary ammonium salt include ammonium hydroxides having an alkyl group, aryl group, alkylaryl group or arylalkyl group, such as tetramethylammonium hydroxide, tetraethylammonium hydroxide, tetrabutylammonoium hydroxide, and trimethylbenzylammonium hydroxide; basic ammonium salts such as tetramethylammonium borohydride, tetrabutylammonium borohydride, tetrabutylammonium tetraphenylborate and tetramethylammonium tetraphenylborate; and quaternary ammonium salt of the general formula (I) in which z is 2, such as bis(tetramethylammonium) carbonate.

Of these nitrogen-containing organic basic compounds, quaternary ammonium salts represented by the general formula (I) are preferable from the viewpoints of its high catalyst-activity, ease of thermal decomposition, being less apt to remain in the polymer, and the like, and are preferably exemplified by tetramethylammonium hydroxide, tetrabutylammonium hydroxide, tetramethylammonium borohydride and tetrabutylammonium borohydride, among which tetramethylammonium hydroxide is particularly preferable.

The nitrogen-containing organic basic compound may be used alone or in combination with at least one other.

On the other hand, as the quaternary phosphonuium salt of the component (b), a variety of such salts are available without specific limitation, and are preferably exemplified by the compound represented by the general formula (II)

$$(PR^3_4)^+_a(X^2)^{a-} \qquad (II)$$

wherein $R^3$ is an organic group and is exemplified by those same as the groups that have been exemplified in the description of $R^1$ in the foregoing general formula (I), four $R^3$ may be the same as or different from each other, and two $R^3$ may combine with each other to form a ring; $X^2$ is a halogen atom, hydroxyl group, alkyloxy group, aryloxy group, alkylcarbonyloxy group, arylcarbonyloxy group, $(R^4O)_2P(=O)O$ in which $R^4$ is a hydrocarbon group such as alkyl group or aryl group and two $R^4O$ may be the same as or different from each other, $BR^5_4$ in which $R^5$ is a hydrogen atom or a hydrocarbon group such as alkyl group and aryl grop and four $R_4$ may be the same as or different from each other, $HCO_3$ or $CO_3$; and a is 2 in the case of $X^2$ being $CO_3$ and is 1 in the other cases.

In the case where $X^2$ in the general formula (II) is a monovalent group ($Y^1$) such as a halogen atom, hydroxyl group, alkyloxy group, aryloxy group, alkylcarbonyloxy group, arylcarbonyloxy group, $(R^4O)_2P(=O)O$, $BR^5_4$ or $HCO_3$, then the quaternary phosphonium salt represented by the general formula (II) is represented by the general formula (II'): and $$(PR^3{}_4)^+(Y^1) \qquad (II')$$

in the case where $X^2$ is a divalent group $(Y^2)$, that is, $CO_3$, it is represented by the general formula (II")

$$(PR^3{}_4)^+{}_2(Y^2)^{2-} \qquad (II")$$

Examples of such quaternary phosphonium salts include tetra(aryl-or-alkyl)phosphonium hydroxide such as tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, tetramethylphosphonium hydroxide, tetraethylphosphonium hydroxide, tetrabutylphosphonium hydroxide and tetrahexylphosphonium hydroxide; mono (aryl-or-alkyl)triphenylphosphonium hydroxide such as methyltriphenylphosphonium hydroxide, ethyltriphenylphosphonium hydroxide, propyltriphenylphosphonium hydroxide, butyltriphenylphosphonium hydroxide, octyltriphenylphosphonium hydroxide, tetradecyltriphenylphosphonium hydroxide, benzyltriphenylphosphonium hydroxide, ethoxybenzyltriphenylphosphonium hydroxide, methoxymethyltriphenylphosphonium hydroxide, acetoxymethyltriphenylphosphonium hydroxide, phenacyltriphenylphosphonium hydroxide, chloromethyltriphenylphosphonium hydroxide, bromomethyltriphenylphosphonium hydroxide, biphenyltriphenylphosphonium hydroxide, naphthyltriphenylphosphonium hydroxide, chlorophenyltriphenylphosphonium hydroxide, phenoxyphenyltriphenylphosphonium hydroxide, methoxyphenyltriphenylphosphonium hydroxide, acetoxyphenyltriphenylphosphonium hydroxide and naphthylphenyltriphenylphosphonium hydroxide; mono(aryl-or-alkyl)trialkylphosphonium hydroxide such as ethyltrimethylphosphonium hydroxide, hexyltrimethylphosphonium hydroxide, octyltrimethylphosphonium hydroxide, phenyltrimethylphosphonium hydroxide, biphenyltrimethylphosphonium hydroxide, methyltrihexylphosphonium hydroxide, ethyltrihexylphosphonium hydroxide, octyltrihexylphosphonium hydroxide, stearyltrihexylphosphonium hydroxide, phenyltrihexylphosphonium hydroxide and bephenyltrihexylphosphonium hydroxide, di(aryl-or-alkyl) di(aryl-or-alkyl)phosphonium hydroxide such as dimethyldiphenylphosphonium hydroxide, diethyldiphenylphosphonium hydroxide, dimethydiethylphosphonium hydroxide, dimethyldihexylphosphonium hydroxide and di(biphenyl) diphenylphosphonium hydroxide; tetra(aryl-or-alkyl) phosphonium tetraphenylborate such as tetraphenylphosphonium tetraphenylborate, tetranaphthylphosphonium tetraphenylborate, tetra(chlorophenyl)phosphonium tetraphenylborate, tetra(biphenyl)phosphonium tetraphenylborate, tetratolylphosphonium tetraphenylborate, tetramethylphosphonium tetraphenylborate, tetraethylphosphonium tetraphenylborate, terabutylphosphonium tetraphenylborate, tetrahexylphosphonum tetraphenylborate and tetraoctylphosphonium teraphenylborate; mono(aryl-or-alkyl)triphenylphosphonium tetraphenylborate such as methyltriphenylphosphonium tetraphenylborate, ethyltriphenylphosphonium tetraphenylborate, propyltriphenylphosphonium tetraphenylborate, butyltriphenylphosphonium tetraphenylborate, octyltriphenylphosphonium tetraphenylborate, tetradecyltriphenylphosphonium tetraphenylborate, bezyltriphenylphosphonium tetraphenylborate, ethoxybenzyltriphenylphosphonium tetraphenylborate, methoxymethyltriphenylphosphonium tetraphenylborate, acetoxymethyltriphenylphosphonium tetraphenylborate, phenacyltriphenylphosphonium tetraphenylborate, chloromethyltriphenylphosphonium tetraphenylborate, bromomethyltriphenylphosphonium tetraphenylborate, biphenyltriphenylphosphonium tetraphenylborate, naphthyltriphenylphosphonium tetraphenylborate, chlorophenyltriphenylphosphonium tetraphenylborate, pheoxyphenyltriphenylphosphonium tetraphenylborate, acetoxyphenyltriphenylphosphonium tetraphenylborate and naphthylphenyltriphenylphosphonium tetraphenylborate; mono(aryl-or-alkyl)trialkylphosphonium tetraphenylborate such as ethyltrimethylphosphonium tetraphenylborate, hexyltrimethylphosphonium tetraphenylborate, octyltrimethylphosphonium tetraphenylborate, phenyltrimethylphosphonium tetraphenylborate, biphenyltrimethylphosphonium tetraphenylborate, methyltrihexylphosphonium tetraphenylborate, ethyltrihexylphosphonium tetraphenylborate, octyltrihexylphosphonium tetraphenylborate, stearyltrihexylphosphonium tetraphenylborate, phenyltrihexylphosphonium tetraphenylborate and biphenyltrihexylphosphnium tetraphenylborate; and di(aryl-or-alkyl)di(aryl-or-alkyl)phosphonium tetraphenylborate such as dimethyldiphenylphosphonium tetraphenylborate, diethyldiphenylphosphonium tetraphenylborate, dimethyldiethylphosphonium tetraphenylborate, dimethyldiethylphosphonium tetraphenylborate, dimethyldihexylphosphonium tetraphenylborate and di(biphenyl)diphenylphosphonium tetraphenylborate.

In addition, mention is made of a quaternary phosphonium salt in which the above-mentioned hydroxide or tetraphenylborate is replaced by, as pair anions, a aryloxy group such as phenoxide, an alkyloxy group such as methoxide, and ethoxide, an alkylcarbonyloxy group such as acetato, an arylcarbonyloxy group such as benzonato or a halogen atom such as chloride or bromide.

Examples having divalent pair anions include quaternary phosphonium salts such as bis(tetraphenylphosphonium) carbonate, bis(biphenyltriphenylphosphonium) carbonate and bis(tetraphenyl)phosphonium salt of 2,2-bis(4-hydroxyphenyl)propane, ethylenebis (triphenylphosphonium) dibromide and trimethylenebis-(triphenylphosphonium)bis(tetraphenylborate).

Of these quaternary phosphonium salts, tetraphenylphosphonium tetraphenyl borate, tetraphenylphosphonium phenolate and tetraphenylphosphonium hydroxide are preferable from the viewpoints of its high catalyst-activity, ease of thermal decomposition, being less apt to remain in the polymer, and the like.

Moreover, the quaternary phosphonium salt represented by the foregoing general formula (II) may preferably be exemplified by the compound represented by the general formula (III)

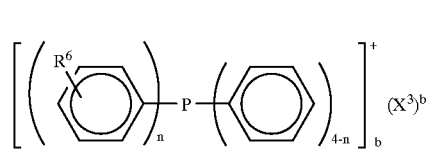

(III)

wherein $R^6$ is an organic group, and a plurality of $R^6$-Ph (phenyl group), when being present, may be the same as or different from each other; $X^3$ is a halogen atome, hydroxyl group, alkyloxy group, aryloxy group, alkylcarbonyloxy group, arylcarbonyloxy group, $BR^7{}_4$ wherein $R^7$ is a hydrogen atom or hydrocarbon group and four $R^7$ may be the same as or different from each other, $HCO_3$ or $CO_3$, b is 2 in the case of $X^3$ being $CO_3$ and is 1 in the other cases; and n is an integer of 0 to 4, and also by the compound containing a branched alkyl group, specifically represented by the general formula (IV)

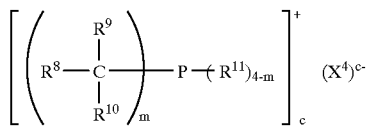
(IV)

wherein $R^8$, $R^9$ and $R^{10}$ are each a hydrogen atom, alkyl group or aryl group, and may be the same as or different from each other, at least two of them may combine with each other to form a ring, but two or three of them are not simultaneously a hydrogen atom, a plurality of $R^8R^9R^{10}C-$, when being present, may be the same as or different from each other; $R^{11}$ is an alkyl group or aryl group and a plurality of $R^{11}$, when being present, may be the same as or different from each other; $X^4$ is a halogen atom, hydroxyl group, alkyloxy group, aryloxy group, alkylcarbonyloxy group, arylcarbonyloxy group, $BR^{12}_4$ wherein $R^{12}$ is a hydrogen atom or hydrocarbon group and four $R^{12}$ may be the same as or different from each other, $HCO_3$ or $CO_3$; c is 2 in the case of $X^4$ being $CO_3$ and is 1 in the other cases; and m is an integer of 1 to 4.

In the case where $X^3$ in the general formula (III) is a monovalent group ($Y^3$) such as a halogen atom, hydroxyl group, alkyloxy group, aryloxy group, alkylcarbonyloxy group, arylcarbonyloxy group, $BR^7_4$ or $HCO_3$, then the quaternary phosphonium salt represented by the general formula (III) is represented by the general formula (III'): and

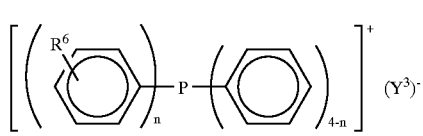
(III')

in the case where $X^3$ is a divalent group ($Y^4$), that is, $CO_3$, it is represented by the general formula (III")

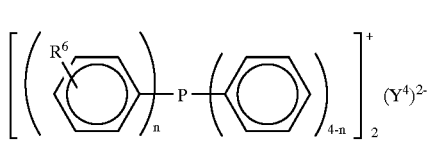
(III")

On the other hand, in the case where $X^4$ in the general formula (IV) is a monovalent group ($Y^5$) such as a halogen atom, hydroxy group, alkyloxy group, aryloxy group, alkylcarbonyloxy group, arylcarbonyloxy group, $BR^{12}$ or $HCO_3$, then the quaternary phosphonium salt containing a branched alkyl group which salt is represented by the general formula (IV) is represented by the general formula (IV'): and

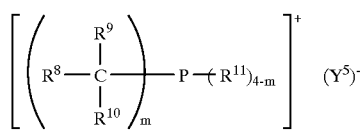
(IV')

in the case where $X^4$ is a divalent group ($Y^6$), that is, $CO_3$, it is represented by the general formula (IV")

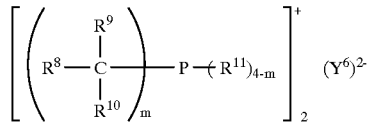
(IV")

In the above-mentioned general formula (III), examples of the cationic portion, that is, phosphonium ion may include biphenyltriphenylphosphonium, methoxyphenyltriphenylphosphonium, phenoxyphenyltriphenylphosphonium and naphthylphenyltriphenylphosphonium and examples of the anionic portion, that is, $(X^3)^{b-}$ include $Cl^-$, $F^-$, $OPh^-$, $CH_3COO^-$, $CH_3CH_2COO^-$, $BH_4^-$, $BPh_4^-$, $HCO_3^-$ and $C_3^{2-}$.

As examples of the quaternary phosphonium salt represented by the general formula (III), mention may be made of various compounds each formed by suitably selecting a cation and anion from those exemplified above and combining with each other. Specific examples thereof include tetraphenylphosphonium hydroxide, biphenyltriphenylphosphonium hydroxide, methoxyphenyltriphenylphosphonium hydroxide, phenoxyphenyltriphenylphosphonium hydroxide, naphthylphenyltriphenylphosphonium hydroxide, tetraphenylphosphonium tetraphenylborate, biphenyltriphenylphosphonium tetraphenylborate, methoxyphenyltriphenylphosphonium tetraphenylborate, phenoxyphenyltriphenylphosphonium tetraphenylborate, naphthylphenyltriphenylphosphonium tetraphenylborate, tetraphenylphosphonium phenolae, biphenyltriphenylphosphonium phenolate, methoxyphenyltriphenylphosphonium phenolate, phenoxyphenyltriphenylphosphonium phenolate, tetraphenylphosphonium chloride, biphenyltriphenylphosphonium chloride, methoxyphenyltriphenylphosphonium chloride, phenoxyphenyltriphenylphosphonium chloride and naphthylphenyltriphenylphosphonium chloride.

In the above-mentioned general formula (IV), examples of the cationic portion, that is, phosphonium ion may include isopropyltrimethylphosphonium; isopropyltriethylphosphonium; isopropyltributylphosphonium; isopropyltriphenylphosphonium; tetraisopropylphosphonium; cyclohexyltriethylphosphonium; cyclohexyltrimethylphosphonium; cyclohexyltributylphosphonium; cyclohexyltriphenylphosphonium; tetracyclohexylphosphonium; 1,1,1-triphenylmethyltrimethylphosphonium; 1,1,1-triphenylmethyltriethylphosphonium; 1,1,1-triphenylmethyltributylphosphonium; and 1,1,1-triphenylmethyltriphenylphosphonium. Examples of the anionic portion, that is, $(X^4)^{C-}$ may include $Cl^-$, $F^-$, $OH^-$, $OPh^-$, $CH_3COO^-$, $CH_3CH_2COO^-$, $BH_4^-$, $HCO_3^-$ and $CO_3^{2-}$.

As examples of the quaternary phosphonium salt containing a branched alkyl group which salt is represented by the general forumula (IV), mention may be made of various compounds each formed by suitably selecting a cation and anion from those exemplified above and combining with each other. Specific examples thereof include isopropyltrimethylphosphonium hydroxide; isopropyltrimethylphosphonium phenolate; isopropyltrimethylphosphonium tetraphenylborate; isopropyltrimethylphosphonium chloride; isopropyltrimethylphosphonium acetate; bis(isopropyltrimethylphosphonium) carbonate; isopropyltriethylphosphonium hydroxide; isopropyltriethylphosphonium phenolate; isopropyltriethylphosphonium tetraphenylborate; isopropyltriethylphosphonium chloride; isopropyltriethylphosphonium acetate; bis(isopropyltriethylphosphonium) carbonate; cyclohexyltriphenylphosphonium hydroxide; cyclohexyltriphenylphosphonium phenolate; cyclohexyltriphenylphosphonium tetraphenylborate; cyclohexyltriphenylphosphonium chloride; cyclohexyltriphenylphosphonium acetate; bis(cyclohexyltriphenylphosphonium) carbonate, cyclopentyltriphenylphosphonium hydroxide; cyclopentyltriphenylphosphonum phenolate; cyclopentyltriphenylphosphonium tetraphenylborate; cyclopentyltriphenylphosphonium chloride; cyclopentyltriphenylphosphonium acetate; bis(cyclopentyltriphenylphosphonium) carbonate, 1,1,1-triphenylmethyltriethylphosphonium hydroxide; 1,1,1-triphenylmethyltriethylphosphonium phenolate; 1,1,1-triphenylmethyltriethylphosphounium tetraphenylborate; 1,1,1-triphenylmethyltriethylphosphonium chloride; 1,1,1-triphenylmethyltriethylphosphonium acetate; and bis(1,1,1-triphenylmethyltriethylphosphonium) carbonate. Of these, cyclohexyltriphenylphosphonium tetraphenylborate and cyclopentyltriphenylphosphonium tetraphenylborate are particularly preferable from the standpoint of working effect.

Examples of the quaternary phosphonium salt other than those exemplified above include bis(tetraphenyl)phosphonium salt of 2,2-bis(4-hydroxyphenyl)propane, ethylenebis(triphenylphosphonium) dibromide and trimethylenebis(triphenylphosphonium)-bis(tetraphenylborate).

The quaternary phosphonium salt as the component (b) may be used alone or in combination with at least one other.

It is preferable that, in the aforestated nitrogencontaining organic basic compound and quaternary phosphonium salt, the contents of metallic impurities be as less as possible and in particular, the contents of alkali metal compounds and alkaline earth metal compounds be 50 ppm or less.

With regard to the first aspect of the present invention, when a dihydroxyl compound is used as a staring raw material for the transesterification, the amount of the nitrogen-containing organic basic compound as the component (a) to be used as the polymerization catalyst is $10^{-1}$ to $10^{-6}$ mol, preferably $10^{-2}$ to $10^{-5}$ mol, more preferably $10^{-3}$ to $10^{-4}$ mol per one mol of the dihydroxyl compound, and the amount of the quaternary phosphonium salt as the component (b) to be used is $10^{-3}$ to $10^{-8}$ mol, preferably $10^{-4}$ to $10^{-7}$ mol, more preferably $10^{-5}$ to $10^{-6}$ mol per one mol thereof. An amount of the component (a) to be used of less than $10^{-6}$ mol will cause a fear of insufficient catalyst-activity, whereas that more than $10^{-1}$ mol unfavorably leads to a increase in cost. On the other hand, an amount of the component (b) to be used of less than $10^{-8}$ mol will cause a fear of insufficient catalyst-activity in the latter stage of the reaction, whereas that more than $10^{-3}$ mol unfavorably leads to an increase in cost.

The polymerization catalyst is incorporated in the dihydroxyl compound as the starting raw material in such an amount that the total amount of the components (a) and (b) becomes usually $10^{-1}$ to $10^{-8}$ mol, preferably $10^{-2}$ to $10^{-7}$ mol, more preferably $10^{-3}$ to $10^{-6}$ mol per one mol of the dihydroxy compound. An amount thereof less than $10^{-8}$ mol will cause a fear of failure to manifest the effect of the catalyst, whereas that more than $10^{-1}$ mol is liable to bring about an increase in cost as well as the deterioration of physical properties of the polycarbonate as the final product, particularly heat resistance and hydrolysis resistance. There is no need, therefore, to use the catalyst in an amount more than $10^{-1}$ mol.

With regard to the second aspect of the present invention, there is used, as the polymerization catalyst in the transesterification, the quaternary phosphonium salt represented by the general formula (III) without a combination of an other component. The quaternary phosphonium salt may be used alone or in combination with at least one of the same components.

It is preferable that, in the aforestated quaternary phosphonium salt, the contents of metallic impurities be as less as possible and in particular, the contents of alkali metal compounds and alkaline earth metal compounds be 50 ppm or less.

With regard to the second aspect of the present invention, when a dihydroxyl compound is used as a staring raw material for the transesterification, the amount of the quaternary phosphonium salt to be used is selected in the range of preferably $10^{-3}$ to $10^{-8}$ mol, more preferably $10^{-4}$ to $10^{-7}$ mol per one mol thereof. An amount of the quaternary phosphonium salt to be used of less than $10^{-8}$ mol will cause a fear of insufficient catalyst-activity in the latter stage of the reaction, whereas that more than $10^{-3}$ mol unfavorably leads to an increase in cost.

With regard to the third aspect of the present invention, there is used, as the polymerization catalyst in the transesterification, the quaternary phosphonium salt containing a branched alkyl group, preferably the quaternary phosphonium salt containing a brached alkyl group which salt is represented by the foregoing general formula (IV) without a combination of an other component.

The quaternary phosphonium salt may be used alone or in combination with at least one of the same components.

It is preferable that, in the aforestated quaternary phosphonium salt, the contents of metallic impurities be as less as possible and in particular, the contents of alkali metal compounds and alkaline earth metal compounds be 50 ppm or less.

With regard to the third aspect of the present invention, when a dihydroxyl compound is used as a starting raw material for the transesterification, the amount of the quaternary phosphonium salt to be used is selected in the range of preferably $10^{-1}$ to $10^{-8}$ mol, more preferably $10^{-2}$ to $10^{-7}$ mol per one mol thereof. An amount of the quaternary phosphonium salt to be used of less than $10^{-8}$ mol will cause a fear of failure to sufficiently exert the catalyst effect whereas that more than $10^{-3}$ mol unfavorably leads to an increase in cost.

There are employed, in any of the first to third aspects of the present invention, the starting raw materials that are used for producing a polycarbonate through the conventional transesterification. It is preferable to carry out the transesterification by the use of the dihydroxyl compound of the component (A), the carbonic acid diester of the component (B) and when necess ary, a terminal stopper or a branching agent. Wit h this method, a polycarbonate excellent in quality can be produced. Specifically, the reaction needs only be made to proceed according to the conventional transesterification process.

In the following, some description will be given specific ally of the procedures and conditions for the production process by means of transesterification.

First of all, the dihydroxy compound of the component (A) and the carbonic acid diester of the component (B) are subjected to transesterification at a (B)/(A) molar ratio of about 0.9 to 1.5. The molar ratio is preferably 0.95 to 1.20, more preferably 0.98 to 1.20, as the case may be, depending upon the situation.

When the terminal stopper comprising the above-mentioned monohydric phenol or the like is present in an amount of 0.05 to 10 mol based on the dihydroxy compound of the component (A) at the time of the transesterification, the hydroxyl group of the resultant polycarbonate is sealed at the ends thereof, thereby producing a polycarbonate markedly excellent in heat resistance and water resistance.

The aforesaid terminal stopper comprising the monohydric phenol or the like may be added to the reaction system in whole in advance, or in part in advance with the balance being added with the progress of the reaction. Alternatively, the terminal stopper may be added in whole to the reaction system, as the case may be, after a partial progress of the transesterification of the dihydroxy compound of the component (A) with the carbonic acid diester of the component (B).

The reaction temperature in the transesterification is selected, without specific limitation, in the range of usually 100 to 300° C., preferably 180 to 300° C., and is more preferably raised to 180 to 300° C. in a gradual manner according to the progress of the reaction. A transesterification temperature lower than 100° C. results in a low rate of reaction, whereas that higher than 330° C. unfavorably brings about side reactions or problems such as coloration of the resultant polycarbonate.

The reaction pressure is set according to the vapor pressure of the monomer to be used and the reaction temperature without specific limitation so that the reaction proceeds efficiently. In many causes, the reaction is put into practice at 1 to 50 atom (760 to 38,000 torr.), that is, under atmospheric (ordinary) pressure or under pressure in the initial stage of reaction, under reduced pressure in the latter stage and preferably at 0.01 to 100 torr. in the final stage.

The reaction time is set so as to achieve a targeted molecular weight of the polymer, and is usually 0.2 to 10 hours.

The transesterification is carried out usually in the absence of an inert solvent, but according to demand, in the presence of an inert solvent in a proportion of 1 to 150% by weight based on the polycarbonate to be produced. The inert solvent is exemplified by an aromatic compound such as diphenyl ether, halogenated diphenyl ether, benzophenone, polyphenylene ether, dichlorobenzene and methylnaphthalene; and a cycloalkane such as tricyclo(5,2,10)decane, cyclooctane and cyclodecane. The reaction may be carried out in an atmosphere of an inert gas when necessary, which is exemplified by argon, carbon dioxide, nitrous oxide, nitrogen, an alkane such as chlorofluorohydrocarbon, ethane and propane, and an alkene such as ethylene and propylene.

In addition, an antioxidant may be add, when necessary, to the reaction system of the transesterification, and is preferably exemplified by a phosphorus-based antioxidant, including trialkyl phosphate such as trimethyl phosphate, triethyl phosphate, tributyl phosphite, trioctyl phosphate, trinonyl phosphite, tridecyl phasphite, trioctadecyl phosphite, distearyl pentaerythritol diphosphite, tris(2-chloroethyl) phosphite and tris(2,3-dichloropropyl) phosphite; tricycloalkyl phosphite such as tricyclohexyl phosphite; triaryl phosphite such as triphenyl phosphite, tricresyl phosphite, tris(ethylphenyl) phosphite, tris(butylphenyl) phosphite, tris(nonylphenyl) phosphite and tris (hydroxyphenyl) phosphite; monoalkyl diaryl phosphite such as 2-ethylhexyl diphenyl phosphite; trialkyl phosphate such as trimethyl phsophate, triethyl phsophate, tributyl phosphate, trioctyl phosphate, tridecyl phosphate, trioctadecyl phosphate, distearyl pentaerythritol diphosphate, tris(2-chloroethyl) phosphate and tris(2,3-dichloropropyl) phosphate; tricycloalkyl phosphate such as tricyclohexyl phosphate; and triaryl phosphate such as triphenyl phosphate, tricresyl phosphate, tris(nonylphenyl) phosphate and 2-ethylphenyl diphenyl phosphate.

As the transesterification proceeds, the phenol and alcohol which correspond to the carbonic acid diester used, the esters thereof and inert solvent are released from the reactor. The released products can be separated, purified and recycled. It is preferable that equipment for releasing such products be installed.

The transesterification can be carried out by a batchwise or continous system by the use of arbitrary equipment. In the case of a continuous system being applied to the production, it is preferable that at least two reactors be used and the foregoing reaction conditions be set.

The reactor to be used in any of the first to third aspects of the present invention is not specifically limited in its material or construction, but needs only be imparted with usual stirring function. It is preferable, however, that the reactor be imparted with high viscosity-type stirring function to cope with viscosity increase in the latter stage of the reaction. Preferable types of the reactor include not only a vessel type but also an extruder type.

It is preferable in the first to third aspects of the present invention that after the completion of the transesterification, the reaction product be heat-treated to thermally decompose the catalyst at a temperature not lower than the catalyst decomposition temperature, preferably at around 300° C. for the purpose of improving the quality (coloration) of the polycarbonate to be produced.

The polycarbonate thus obtained may be granulated as such or molded by the use of an extruder.

As described hereinbefore, the first to third aspects of the present invention relate to a process for producing a polycarbonate by means of transesterification, while the fourth aspect of the invention pertains to a process for producing a polycarbonate which comprises the steps of preparing in the first place, a polycarbonate prepolymer by preliminary polymerization and thereafter polymerizing the resultant prepolymer in a state of a solid phase in the presence of a catalyst comprising a quaternary phosphonium salt.

In the following, some description will be given of the fourth aspect of the invention.

It is necessary in the fourth aspect of the invention to prepare a polycarbonate prepolymer (hereinafter abbreviated to "Prepolymer") by preliminary polymerization. Usable methods for preparing the Prepolymer include (1) transesterification and (2) interfacial polycondensation.

In the method for preparing the Prepolymer by means of the (1) transesterification, the starting raw materials to be used therein is not specifically limited, but may be any of various materials that are used for the production by the convnetional transesterification. As is the case with any of the first to third aspects of the present invention, mention is made of (1) combination of a dihydroxyl compound as the component (A) and a carbonic acid diester as the component (B); (2) combination of a diester of a dihydroxyl compound as the component (A) and a carbonic acid diester as the component (B); (3) combination of a dicarbonic acid ester of a dihydroxyl compound as the component (A) and a carbonic acid diester as the component (B); (4) a dicarbonic acid ester of a dihydroxyl compound (self-condensation); (5) a monocarbonic acid ester of a dihydroxyl compound (self-transesterification) and the like.

Of these, the combination of a dihydroxyl compound as the component (A) and a carbonic acid diester as the component (B) item (1) is preferably used.

As the staring raw materials including the dihydroxyl compound of the component (A) and the carbonic acid diester of the component (B) as described hereinbefore and those excluding the components (A) and (B), mention is made of the species as described in the first to third aspects of the present invention.

In addition, as the terminal stopper and branching agent, which are used as required in the production of the Prepolymer by means of transesterification, mention is made of the terminal stoppers and branching agents as described in the first to third aspects of the invention.

The preparation of the Prepolymer by the preliminary polymerization through the transesterification can be put into practice according to a publicly known transesterification method, for example, by a method in which the hydroxyl compound of the component (A) and the carbonic acid diester of the component (B) that are used as starting raw materials are mixed with a terminal stopper or a branching agent when necessary, and a catalyst and are heat-treated to proceed with the transesteification, while the monohydroxyl compounds corresponding to the carbonic acid diester are released.

In the above-mentioned method, a nitrogen-containing organic basic compound is preferably used as the catalyst. It is necessary in a solid-phase polymerization of the Prepolymer according to the fourth aspect of the present invention to use a quaternary phosphonium salt, which may be added, together with the aforestated nitrogen-containing organic basic compound, to the preliminary polymerization system for preparing the Prepolymer in part or whole of the amount necessary for the polymerization in a state of a solid phase. As the nitrogen-containing organic basic compound, mention is made of the catalyst a s the component (a) as de scribed in the first to third aspects of the present invention. Such compound may be used alone or in combination with at least one other. The quaternary phosphonium salt is exemplified by those described as the catalyst of the component (b) in the foregoing first to third aspects of the pre sent invention. Such salt may be used alone or in combination with at least one other. It is preferable that, in the nitrogen-containing organic basic compound and quaternary phosphonium salt that are used as the catalysts, the contents of metallic impurities be as less as possible and in particular, the contents of alkali metal compounds and alkaline earth metal compounds be 50 ppm or less.

The amount of the nitrogen-containing org anic basic compound to be used is selected in the range of preferably $10^{-2}$ to $10^{-8}$, more preferably $10^{-3}$ to $10^{-7}$ mol per one mol of the dihydroxyl compound. An amount thereof less than $10^{-8}$ mol will cause a fear of insufficient effect as the catalyst, whereas that more than $10^{-2}$ unfavorably leads to an increase in cost. On the other hand, there is no need to use the quaternary phosphonium salt in the preliminary polymerization, but as mentioned above, it may be added to the preliminary polymerization system in part or whole of the amount required for the next step of the polymerization in a state of a solid phase.

The proportions in using the dihydroxyl compound and the carbonic acid diester in the production of the polycarbonate prepolymer through the transesterification vary depending on the types of the compound and diester and the reaction conditions such as reaction temperature, and the carbonic acid diester is used in an amount of usually 0.9 to 2.5 mols, preferably 0.95 to 2.0 mols, more preferably 0.98 to 1.5 mol per one mol of the dihydroxy compound.

The reaction temperature varies depending on the kinds and amounts of the starting raw materials and the catalyst and other conditions, but is preferably 100 to 320° C., more preferably 100 to 300° C., particularly preferably 150 to 280° C. The pressure at the time of reaction is preferably 1 Torr to 5 kg/cm$^2$G, more preferably 10 Torr to 2 kg/cm$^2$G. A reaction temperature lower than the above-mentioned range results in failure to sufficiently proceed with the transesterification, whereas that higher than the range brings about the unfavorable phenomenon such that the carbonic acid diester as the starting raw material is distilled away from the reaction system together with the by-produced monohydroxyl compound. A pressure at the time of reaction higher than the aforesaid range unfavorably results in that the by-produced monohydroxyl compound is not distilled away, whereby the proceeding of the reaction is prevented, whereas that lower than the range unfavorably results in that the carbonic acid diester as the starting raw material is distilled away, thereby causing variation in the constitution inside the reaction system. The reaction time depends on the reaction conditions and other conditions and cannot be unequivocally determined, but is selected in the range of preferably 1 minute to 100 hours, more preferably 2 minutes to 100 hours.

It is desirable to carry out the preliminary polymerization reaction at a temperature as low as possible during a short period of time in order that the Prepolymer may not be colored. As particularly preferable conditions, the reaction temperature is selected in the range of 150 to 280° C., and the reaction time is selected in the range of several minutes to several hours. The preliminary polymerization is required only to produce a Prepolymer having a relatively low molecular weight, and the abovementioned reaction conditions readily enable the production of colorless transparent Prepolymer having a necessary degree of polymerization.

As the reaction proceeds in the preliminary polymerization, there are produced monohydroxyl compounds which correspond to the carbonic acid diester. By removing such byproducts outside the reaction system, the rate of reaction is enhanced. There are preferably usable a method in which effective stirring is carried out and at the same time, an inert gas such as nitrogen, argon, helium and carbon dioxide or a lower hydrocarbon gas is introduced in the reaction system to remove the monohydroxyl compounds by allowing such compounds to accompany the above gas; a method in which the reaction is put into practice under reduced pressure; and a method in which the foregoing two methods are combined.

The preliminary polymerization reaction is carried out preferably in a molten state, Needless to say, there may be used a solvent which is inert to the reaction, such as methylene chloride, chloroform, 1,2-dichloroethane, tetrachloroethane, dicyclobenzene, tetrahydrofuran, diphenylmethane and diphenyl ether, but the preliminary polymerization is carried out usually in the absence of a solvent and in a molten state.

The reactor to be used in the production process of the Prepolymer by means of transesterification may be any of the polymerization reactors that have heretofore been known and suitable examples of the reactor include a vertical or horizontal reactor equipped with a stirrer and a temperauture control system using an external heat exchanger or the like. The reaction process may be composed of one step or a plurality of steps, and a plurality of reactors may be used in series or in parallel. The production system may be any of batchwise system, continous system or combination system thereof. However, continous system is preferable in order to obtain a uniform Prepolymer.

It is important in the production of the Prepolymer to prevent the carbonic acid diester from being distilled away outside the system. Thus, in the first place it is required that the dihydroxyl compound and the carbonic acid diester as the starting raw materials be fed in molten state together or separately into a reactor, or that the molten dihydroxyl compound be incorporated with the carbonic acid diester in the form of powder to form a melt of the starting raw materials.

Since unreacted carbonic acid diester becomes more liable to be distilled away with increases in temperature and vacuum, that is, the distilling away thereof is closely related to the reaction temperature and pressure, it is preferable that the progress degree of the reaction be calculated from the distilling away rate of the monohydroxyl compound and the viscosity of the Prepolymer, and the calculation results be subjected to feedback control to control the reaction conditions including the reactor temperature and pressure. Moreover, the distilling away of the carbonic acid diester can be suppressed by interposing a packed tower or a distillation tower between the reactor and the condenser to increase the recovery efficiency of the monohydroxyl compound which is distilled away.

The molecular weight of the Prepolymer thus obtained is selected in the range of preferably 1,000 to 30,000, more preferably 1,500 to 30,000, particularly preferably 3,000 to 20,000 expressed in terms of viscosity-average molecular weight (Mv). A viscosity-average molecular weight thereof less than 1,000 leads to a long time required for the polymerization in a state of a solid-phase and besides to a fear of causing difficulty in maintaining a state of a solid phase because of its low melting point. On the other hand, a Prepolymer having a viscosity-average molecular weight of 30,000 usually makes itself usable as a polycarbonate, and in many cases makes it unnecessary to further polymerize into a higher molecular weight. With regard to the molar terminalratio of the Prepolymer, the ratio of carbonate terminal to hydroxyl-group terminal is 1:4 to 4:1, preferably 1:1.5 to 1.5: 1, more preferably 1:1 to 1.1:1. A terminal ratio outside the foregoing range results in that the finally attainable molecular weight is limited, whereby it is made difficult to contrive a higher molecular weight.

An antioxidant may be added as required to the reaction system in the production of the Prepolymer by means of transesterification. The antioxidant is preferably a phosphorus-based antioxidant, and is exemplified by those as exemplified in the description of the first to third aspect of the present invention.

The method for preparing the Prepolymer by means of (2) interfacial polycondensation method is not specifically limited, but can be carried out according to a publicly known method in which, for example, a dihydroxyl compound is reacted with phosgene in the presence of aterminal stopper and when desired, a branching agent, an acid-bondable agent or a solvent. The dihydroxyl compound and the branching agent are exemplified by those as described in the foregoing first to third aspects of the present invention. As the terminal stopper, there is preferably used a compound containing a monohyric hydroxyl group such as phenol. As the acid-bondable agent, there are preferably used 5 to 10% by weight aqueous solution of an alkali and a tertiary amine such as pyridine. As the solvent, there are usually used methylene chloride, chloroform, carbon tetrachloride, tetrachloroethylene, chlorobenzene, xylene and the like.

It is advantageous that phosgene be added to the reaction system by gasifying and blowing into the mixture of the dihydroxyl compound, acid-bondable agent, terminal stopper and solvent, or by dissolving it in a solvent and adding the resultant solution dropwise to the mixture. The aforesaid terminal stopper may be added to the reaction system at any time before, during or after the reaction of the phosgene, but is preferably added thereto before or during the reaction.

The molecular weight and terminal ratio of the Prepolymer are each same as that of the Prepolymer obtained by means of transesterification.

In the fourth aspect of the present invention, the Prepolymer obtained by preliminary polymerization through the transesterification or interfacial polycondensation, is polymerized in a state of a solid phase in the presence of a quaternary phosphonium salt as the catalyst to increase the molecular weight, thereby producing a polycarbonate. The amount of the quaternary phosphonium salt as the catalyst which is present in a state of a solid phase in the polymerization system is selected in the range of preferably $10^{-2}$ to $10^{-8}$ mol, more preferably $10^{-3}$ to $10^{-7}$ mol per one mol of the dihydroxy compound as the starting raw material. An amount thereof less than $10^{-8}$ mol brings about a fear of failure to sufficiently exert a catalyst effect, whereas that more than $10^{-2}$ mol unfavorably causes a fear of deteriorating the quality of the polycarbonate and besides a increase in cost.

As the polymerization method in a state of a solid phase according to the fourth aspect of the present invention, there are preferably usable (1) solid-phase polymerization method in which the Prepolymer is polymerized by heating in a state of a solid phase in an inert gas atmosphere or under reduced pressure, and (2) swelling solid-phase polymerization method in which the Prepolymer is polymerized by heating in a state of a swelling solid phase in an atmosphere of a swelling solvent gas, or a mixed gas of a swelling solvent gas and either or both of a poor solvent and an inert gas. Hereinafter, solid-phase polymerization method and swelling solid-phase polymerization method are referred to as the method (1) and method (2), respectively.

In the following, some description will be given of the above-mentioned solid-phase polymerization method (1).

The weight-average molecular weight of the Prepolymer to be used in the solid-phase polymerization method is in the range of preferably 2,000 to 20,000, more preferably 2,500 to 15,000, particularly preferably 4,000 to 12,000. A weight-average molecular weight thereof less than 2,000 unfavorably results in a long reaction-time required for the solid-phase polymerization, whereas that more than 20,000 is less necessary. Prior to the solid-phase polymerization, the Prepolymer is subjected, as required, to crystallizing treatment, which is intended not to cause fusing adhesion of the Prepolymer in the solid-phase polymerization.

The crystallizing treatment can be carried out by any of a variety of methods without specific limitation, particularly preferably by solvent treatment method or heating crystallizing method. The former solvent treatment method include, for example, a method in which the Prepolymer is dissolved in a suitable solvent, and then the solvent is evaporated; or the Prepolymer is incorporated with a poor solvent to precipitate the Prepolymer in solid form and a method in which the Prepolymer is brought into contact with a solvent in liquid or vapor form having low dissolving capacity to the Prepolymer so that the solvnt penetrates into the Prepolymer to crystallize the same. Examples of preferable solvent usable for the solvent treatment of the Prepolymer include an aliphatic halogenated hydrocarbon such as chloromethane, methylene chloride, chloroform, carbon tetrachloride, chloroethane, dichloroethane (various types), trichloroethane (various types), trichloroethylene and tetrachl6roethane (various types); aromatic hydrogenated hydrocarbon such as chlorobenzene and dichlorobenzene; etheric compound such as tetrahydrofuran and dioxane; esteric compound such as methyl acetate and ethyl acetate; ketonic compound such as acetone and methyl ethyl ketone; and aromatic hydrocarbon such as benzene, toluene and xylene. Any of these solvent may be used alone or in combination with at least one other.

The amount of the solvent to be used for the solvent treatment of the Prepolymer varies depending on the kinds of the Prepolymer and the solvent, required crystallinity, treatment temperature and the like, but is selected in the range of preferably 0.05 to 100, more preferably 0.1 to 50 times by weight based on the Prepolymer.

On the other hand, the heating crystallizing method is a method in which the Prepolymer is heated to crystallize the same at a temperature not lower than the glass transition point of the objective polycarbonate and lower than the temperature at which the Prepolymer begins to melt. This method can crystallize the Prepolymer only by maintaining the same under heating and therefore, can be put into industrial practice with extreme ease.

The temperature at which the heating crystallization is performed $-Tc$ (°C.) needs only be not lower than the glass transition point of the objective polycarbonate and also lower than the melting point of the Prepolymer $-Tm$ (°C.) without specific limitation. However, lower temperatures lead to a low crystallization rate, and thus a particularly preferable heating crystallization temperature $Ti$ (°C.) is selected in the range shown by the expression:

$$Tm-50 \leq Tc < Tm$$

The heating crystalization of the Prepolymer may be carried out at a constant temperature in the above-mentioned range or by varying the temperature continuously or intermittently, or by the combination of these methods. As the method in which the heating crystallization is conducted with variation in temperature, it is particularly preferable to raise the temperature at a rate same as the rate at which the melting point of the Prepolymer rises in a usual manner, accompanying the progress of the heating crystallization.

Such heating crystallizing method with variation in temperature can increase the crystallization rate of the Prepolymer and raise the melting point as compared with the method under a constant temperature. The heating crystallization time varies depending upon the chemical composition of the Prepolymer, use or nonuse of a catalyst, crystallization temperature, crystallization method and the like, and is preferably in the range of 1 to 200 hours.

The Prepolymer crystallized by such crystalling treatment can easily be Judged by the loss of Prepolymer transparency, and of course, can also be confirmed by X-ray diffraction.

In the solid-phase polymerization method, polymerization reaction is caried out by the use of a quaternary phosphonium salt as a catalyst, and is accelerated by taking out, outside the system, either or both of the by-produced monohydroxyl compound and the carbonic acid diester. There are preferably used, for the purpose, a method in which the carbonic acid diester and monohydroxyl compounds are removed outside by allowing them to accompany the gas introduced into the system, such as an inert gas including nitrogen, argon, helium and carbon dioxide or a lower hydrocarbon gas; a method in which the reaction is carried out under reduced pressure; and a method in which these methods are combined with each other. In the case of introducing a gas for accompaniment, it is desirable to preheat the gas to a temperature around the reaction temperture.

The Prepolymer to be used in carrying out the solid-phase polymerization reaction is not particularly limited in its shape or form, but is preferably in the form of pellet, bead, granule or powder, while the Prepolymer in the form of large lump is unfavorable in view of a low rate of reaction caused thereby and troublesomeness in its handling. The Prepolymer in solid form which has been crushed into an appropriate size is also preferably used. The Prepolymer crystallized by solvent treatment is obtained usually in the form of porous granule or powder, and such porous Prepolymer is preferable because of facility of withdrawing the carbonic acid diester and the monohydroxyl compounds that are by-produced at the time of solid-phase polymerization.

As the reaction catalyst in the solid-phase polymerization, a quaternary phosphonium salt is used along with, as required, an other catalyst. The catalyst which was used and left in the Prepolymer production step may be used as such, or may be added to the system by again making it into the form of powder, liquid or gas. The polycarbonate to be produced can be improved in its quality by adding, as required, a terminal stopper or an antioxidant in the form of powder, liquid or gas.

As the terminal stopper and antioxidant, mention is made of the species as described in the foregoing first to third aspects of the present invnention.

The reaction temperature $Tp$ (°C.) and reaction time in carrying out the solid-phase polymerization reaction vary depending on the type and property of the Prepolymer such as chemical structure, molecular weight, form or shape, crystallinity and melting point $Tm'$ (°C.), type and amount of the catalyst, degree of polymerization required for the objective polycarbonate and other reaction condtions. The reaction is carried out by means of heating preferably at a temperature not lower than the glass transition temperature of the objective polycarbonate and in the range maintaining the Prepolymer in a state of solid phase without melting, preferably in the temperature range shown by the expression: $Tm'-50 \leq Tp < Tm'$, for 1 minute to 100 hours, more preferably for 0.1 to 50 hours.

In the case of producing a polycarbonate from bisphenol A, the reaction temperature is preferably in the range of about 150 to 260° C., particularly preferably about 180 to 230° C.

In the solid-phase polymerization method, in order to heat the polymer in the course of polymerization as uniformly as possible or favorably proceed with the removal of the by-produced monohydroxy compound and carbonic acid diester, the reaction system is effectively stirred by a method using agitation blades, a method using a reactor of self-revolving construction or a method in which the system is fluidized with a heating gas.

In the case where the crystallization of the Prepolymer is put into practice by heating crystallization, it is possible to withdraw the monohydroxy compound and carbonic acid diester from the reaction system to proceed with the solid-phase polymerization by reducing the system pressure or introducing heating gas for accompaniment into the system, following the single heating-procedure for achieving a prescribed crystallinity.

The weight-average molecular weight of the polycarbonate which is industrially useful is usually in the range of 6,000 to 200,000, preferably 10,000 to 50,000, more preferably 15,000 to 40,000. The polycarbonate having a degree of polymerization equivalent to the aforesaid molecular weight is easily obtained by conducting the solid-phase polymerization method as described above.

The form of the polycarbonate produced by such solid-phase polymerization method depends on the form of the Prepolymer used, as the case may be, and the polycarbonate thus obtained is usually in the form of bead, granule or powder. The crystallinity of the polycarbonate obtained by the solid-phase polymerization of the Prepolymer, is usually higher than that of the Prepolymer, whereby crystalline polycarbonate in powder form is generally obtained. It goes without saying that the crystalline polycarbonate in powder form which has been uniformized to a prescribed molecular weight by the solid-phase polymerization can be introduced in an extruder as it is without cooling to pelletize the same, or directly in a molding machine without cooling to mold the same.

The above-mentioned method enables the production of the polycarbonate having a desired average molecular weight by the combination of the preliminary polymerization and solid-phase polymerization, and it is also possible to vary, in a wide range, the proportion of the preliminary polymerization which contributes to the polymerization to the solid-phase polymerization.

In carrying ou t the present invention, the reaction equipment in any step of the preliminary polymerization, crystallization and solid-phase polymerization may be any of batchwise system, flow system and combination system of the above two systems.

The preliminary polymerization step, which is intended only for the production of the Prepolymer having a relatively low molecular weight, dispenses with an expensive reaction equipment for a high-viscosity fluid which is required for high-temperature melting polymerization so-called melting method such as transesterification. In addition, the crystallization step, which enables crystallization only by the solvent treatment or heating treatment of the Prepolymer, does not necessitate any special equipment. In the solid-phase polymerization step, the Prepolymer can be polymerized with any equipment capable of substantially heating the Prepolymer and removing the by-produced monohydroxy compound and carbonic acid diester.

The solid phase polymerization can efficiently be carried out by using a crystallized spherical Prepolymer having a sphericity of 0.8 to 1.0 expressed in terms of Wadell sphericity and in particular, a particle diameter of 0.5 to 3 mm, since the fluidity is improved and sticking or blocking is lessened.

Such spherical Prepolymer can be prepared by feeding a solution of the Prepolymer in an organic solvent to a granulating vessel containing the powdery Prepolymer which has been stirred in advance, evaporating the solvent while the solution is brought into contact with the powdery Prepolymer and granulating the same into crystallized spherical Prepolymer. The concentration of the Prepolymer to be used in the solution from the organic solvent is selected in the range of preferably 1 to 50% by weight, more preferably 5 to 45% by weight. A concentration thereof lower than 1% by weight unfavorably causes an excessively large amount of the organic solvent to be vaporized in the granulation step. In such a case, the solution of the Prepolymer in an organic solvent is preferably concentrated in advance to a desired concentration. On the other hand, a concentration thereof higher than 50% by weight unfavorably leads to an excessively high viscosity of the solution of the Prepolymer in an organic solvent, thus making it difficult to feed the solution to the granulation vessel.

The viscosity-average molecular weight of the spherical Prepolymer thus obtained is in the range of preferably 1,000 to 25,000. A viscosity-average molecular weight of less than 1,000 unfavorably results in the liability to destruction of the crystallized powder, difficulty in handling the Prepolymer at the time of solid-phase polymerization and an unreasonably long polymerization time, whereas that more than 25,000 makes it less necessary to increase the molecular weight by means of solid-phase polymerization from the practical point of view.

The crystallized spherical polymer having almost complete sphericity can be prepared by a specific method in which a granulating vessel is charged at first with the powdery Prepolymer to bring it into a stirred state; then the vessel containing the powdery Prepolymer stirred in advance is charged with the solution of the Prepolymer in an organic solvent; the solution is brought into contact with the powdery Prepolymer under stirring so that the organic solvent is evaporated on the powdery Prepolymer; and the Prepolymer is granulated by consecutive stirring mixing.

The spherical Prepolymer which has been granulated in the granulateing vessel is taken out from the vessel by an appropriate means, and is employed in the next step to produce a polycarbonate through solid-phase polymerization.

As the powdery Prepolymer to be fed to the granulating vessel in advance and brought into a stirred state prior to the granulating in the granulation procedure, there is usable a Prepolymer which can be obtained by a previously known method, for example, a Prepolymer obtained by concentrating pulverization by the use of a kneader. As the granulation proceeds and the spherical Prepolymer is taken out from the vessel, the granulated spherical Prepolymer replaces the powdery Prepolymer which has been in a stirred state in advance. In the same way, spherical Prepolymer can be continuously produced.

The particle diameter of the powdery Prepolymer to be fed to the granulating vessel in advance is not specifically limited, but is preferably uniformized to 0.5 to 3 mm, approximately. A particle diameter departing from the aforesaid range is unfavorably prone to form agglomerate.

The amount of the powdery Prepolymer to be fed thereto is not specifically limited, but is preferably such that the powdery Prepolymer can be fluidized and uniformly stirred at least when the agitaion blades are operated.

The amount of the solution of the Prepolymer in an organic solvent to be fed to the granulating vessel is at most 500%, preferably at most 300% by weight per hour based on the retention amount of the powdery Prepolymer which is uniformly stirred in advance in the granulation vessel. A low feed rate unfavorably lowers the productivity, whereas an unreasonably high feed rate unfavorably increases the amount of residual solvent in the spherical Prepolymer to be produced.

The method for feeding the solution of the Prepolymer in an organic solvent to the granulating vessel is not specifically limited, but may be a method in which the solution of the Prepolymer is fed onto the powdery Prepolymer under stirring so as to add the solution dropwise or run down it to the Prepolymer, or a method in which the solution of the Prepolymer is heated under pressure and flushed in the vessel.

In the case of feeding the solution of the Prepolymer to the granulating vessel, the granulation can be performed more effectively by simultaneously feeding a non-solvent or poor solvent of a polycarbonate as a crystallizing agent, which is exemplified by straight-chain or cyclic alkanes such as pentane, hexane, heptane, and octane; ketones such as acetone and methyl ethyl ketone; and aromatic compounds such as benzene, toluene and xylene. The crystallizing agent may be used alone or in combination with at least one other.

Of these, the alkane such as pentane, hexane and heptane and the ketone such as methyl ethyl ketone are preferable from the viewpoint of operation, cost and facility of removing from the spherical Prepolymer.

In the case of simultaneously feeding a crystallizing agent, the amount thereof to be fed is preferably 5 to 50%, more preferably 10 to 50% by weight based on the Prepolymer in the solution containing an organic solvent.

The amount thereof less than 5% by weight unfavorably deteriorates the drying property of the spherical Prepolymer, whereas that more than 50% by weight unfavorably lowers the bulk density thereof after drying.

The retention time of the spherical Prepolymer in the granulating vessel, which is related to the feed rate of the solution of the Prepolymer, is usually 0.2 to 6 hours, approximately. An excessively short retention time unfavorably results in that the retention amount of the spherical Prepolymer to be granulated is decreased, whereby sufficient stirring and mixing are not expectable. Conversely, an excessively long retention time unfavorably necessitates unnecessarily large vessel, thus causing a disadvantage from economical viewpoint.

In the case of granulating the spherical Prepolymer in the granulating vessel, it is desired that the temperature in the vessel be maintained so as to form an atmosphere in which the organic solvent in the solution is not prevented from evaporating. In more detail, the boiling point of the organic solvent is kept in the range of about 5 to 150° C., usually 35 to 200° C. A temperature thereof lower than 35° C. unfavorably results in failure to efficiently evaporate away the organic solvent, whereas that higher than 200° C. causes fusing adhesion of the spherical Prepolymer to be granulated, thus making it difficult to granulate the same.

The pressure in the granulating vessel in the course of granulation is preferably −500 mm Hg to 10 kg/cm$^2$G, more preferably −200 mm Hg to 3 kg/cm$^2$G, particularly preferably around atmospheric pressure. A pressure lower than −500 mm Hg unfavorably gives rise to expensiveness in vaccum operation, whereas that higher than 10 kg/cm$^2$G unfavorably causes the problem of the condensation of the organic solvent in the vessel and necessitates a pressure resistant vessel though there is no problem in particular with granulation itself.

In commercially carrying out the granulation, examples of favorably usable machinery include, for example, kneaders, band mixers, mixers of rotary drum type, ribbon type drier and disc dryer. Examples of the machinery for stirring include Henschel mixer (produced by Mitsui Miike kakoki Co., Ltd.), Nauta Mixer (produced by Hosokawa Micron Co., Ltd.), Turbo Sphere E Mixer (produced by Sumitomo Heavy Industries, Ltd.) and Turbulizer (produced by Hosokawa Micron Co., Ltd.). Example of the suitable stirrer include helical blade, paddle blade, grid type blade, etc. In particular, the machinery is preferably equipped with a vertical helical ribbon or a paddle type mixer, or with a jacket for heating a granulating vessel.

As described above, solid-phase polymerization can efficiently be carried out with improved fluidity and minimized blocking by using spherical Prepolymer granulated to complete sphericity in solid-phase polymerization, even if a solid-phase polymerization reactor without stirring mixing function is employed.

FIG. 1 is a schematic explanatory drawing showing an example of process for producing spherical Prepolymer and continuously producing a polycarbonate through solid-phase polymerization by the use of the resultant Prepolymer.

A granulating vessel A is equipped with a stirrer 1 (having a stirring blade 2) for stirring the powdery Prepolymer and a jacket 3 for controlling the temperature of the vessel A. There exists, in the vessel A which is heated to a prescribed temperature with the jacket 3, powdery Prepolymer (not shown in the drawing) which has been stirred in advance with a stirrer 1, and in the vessel A are fed a solution of the Prepolymer in an organic solvent B and, as required, a crystallizing agent C.

In the granulating vessel A, the solution of the Prepolymer in an organic solvent B thus fed is brought into contact with the powdery Prepolymer under stirring to evaporate the organic solvent in the solution so that the Prepolymer is granulated into spherical form. The evaporated organic solvent is introduced in an organic solvent recovery step D, recovered and recycled for use.

The granulated spherical Prepolymer G is taken out through the bottom of the vessel A by utilizing a value 4, dried as necessary with a predryer E, and then conveyed into a solid-phase polymerization reactor H. The organic solvent which evaporates along with drying in the predryer E is introduced in an organic solvent recovery step F, where the solvent is recovered.

As the granulation proceeds and the spherical Prepolymer is taken out from the vessel A, the powdery Prepolymer existing in the vessel is replaced with the spherical Prepolymer thus formed, which then comes into contact with the solution of the Prepolymer to evaporate the organic solvent and fulfill the granulation function, whereby the granulation can be continuously carried out. Needless to say, the granulation may be performed through a batchwise system by allowing the powdery Prepolymer to exist in advance in the vessel.

The solid-phase polymerization reactor H is equipped with a Jacket 5 and a nitrogen gas blowing-in port J.

Nitrogen gas is blown into the reactor H which has been heated with the jacket 5 to a required temperature, where the spherical Prepolymer transferred from the vessel A is subjected to solid-phase polymerization to enable the production of the polycarbonate L.

The polycarbonate L formed by solid-phase polymerization in the reactor H is discharged continuously or batchwise through the bottom of the reactor by utilizing a value 6.

The polycarbonate thus produced is granulated optionally with an extruder and is molded according to various purpose of use.

The nitrogen gas blown into the reactor H is transferred to the nitrogen gas recovery step K along with the progress of the reaction, recovered there and recycled.

According to the production process hereinbefore described, it is made possible to improve the operability in the solid-phase polymerization step of the polycarbonate prepolymer, minimize the occurrence of troubles and at the same time, contrive the curtailment of process energy cost and simplification of the process in the solid-phase polymerization.

In the following, some description will be given of the above-mentioned (2) swelling solid-phase polymerizaion method.

In the swelling solid-phase polymerization method, a high molecular weight polycarbonate is produced by heating polymerizing the Prepolymer obtained in the foregoing preliminary polymerization in a state of a swelling solid phase in an atmosphere of swelling solvent gas, or a mixed gas of a swelling solvent gas and either or both of a poor solvent and an inert gas.

In the case of vaporizing away or extractively removing a low molecular compound such as by-produced phenol in the process for producing a polycarbonate by means of transesterification, a higher mass transfer rate is obatined and higher efficiency of the reaction is attained by vaporizing away or extractively removing a low molecular compound from a polymer (prepolymer) in a state of swelling by a swelling gas, than from a highly viscous molten polymer or a crystallized solid. The foregoing principle is applied to the swelling solid-phase polymerization.

The viscosity-average molecular weight of the Prepolymer to be used in the swelling solid-phase polymerization method is in the range of preferably 1,500 to 30,000, more preferably 3000 to 20,000. A viscosity-average molecular weigh thereof less than 1500 sometimes unfavorably causes the necessity for lowering the swelling solid-phase polymerization temperature because of the low melting point of the Prepolymer, whereas that more than 30,000 often makes it less necessary to further carry out the swelling solid-phase polymerization. In the first place, the Prepolymer is subjected, when necessary, to granulation treatment to prepare granulated Prepolymer of a form improved in operability. As the granulation method, there are usable case by case, for example, rolling granulation method, extruding granulation method, compressing granulation method, melting granulation method, spray-drying granulation method, fluidizing granulation method using fluidized bed, disintegrating granulation method, stirring granulation method, liquid-phase granulation method, vacuum freezing granulation method, and the like.

The form of the Prepolymer is not specifically limited, but is preferably pellet, bead, granule or powder from the standpoint of operability. It is more preferably agglomerate of fine granis or porous matter. In the case where the Prepolymer is produced by transesterification in a molten state, it is preferable to adopt a method in which fine granis are formed or agglomerated. The specific surface area of the grains is preferably not less than 0.15 m$^2$/g.

Stirring granulation method is also effective, in which the Prepolymer is once dissolved in a swelling solvent to be used in swelling solid-phase polymerization and a poor solvent for the Prepolymer is mixed in the resultant solution to precipitate powdery Prepolymer. The Prepolymer need not be particularly dried at the time of polymerization.

The particle diameter of the Prepolymer, which depends on the flow velocity of the swelling solvent vapor in swelling solid-phase polymerization as well as the operability of the Prepolymer, is in the range of usually 10 micron to 10 cm, preferably 100 micron to 1 cm. A particle diameter smaller than the above-mentioned range possibly results in that fine grains are entrained by the flow of the swelling solvent vapor, thereby causing clogging in valves and piping and evil influence on a solvent recovery step, whereas that larger than the range leads to an increase in the diffusion distance required for the solvent and a long time required for the reaction because of failure to exhibit the swelling effect.

The-granulation conditions vary depending on the molecular weight of the Prepolymer, granulation method, and the kind and the boiling point of a solvent in the system using the solvent, and include a preferable temperature range of not lower than 20° C. A crystallizing procedure which is required in a usual solid-phase poymerization is not needed in this granulation procedure in particular. It is needless to say that the granulation may be carried out after or simultaneously with crystallization.

Subsequently, the Prepolymer thus granulated is subjected to swelling solid-phase polymerization to form a high molecular weight polymer. By carrying out the polymerization in a state of a solid phase in the presence of a swelling solvent vapor during the swelling solid phase polymerization, the by-produced monohydroxyl compounds and carbonic acid diesters are efficiently removed by virture of the swelling effect. It is possible, therefore, to perform the reaction at a temperature lower than that in a conventional transesterification in a molten state, and also to remarkably shorten the reaction time as compared with a conventional solid phase polymerization and transesterification.

The swelling solvent to be used stands for a single swelling solvent capable of swelling a polycarbonate under the reaction conditions as described hereunder, a mixture of such solvents, and a mixture of the single swelling solvent or a mixture thereof with a single poor solvent for a polycarbonate or a mixture of several such poor solvents.

That is to say, by the use of the swelling solvent, it follows that at least one solvent capable of swelling under the following conditions always exists in the reaction system. A poor solvent for a polycarbonate is sometimes mixed in the swelling solvent for the purpose of controlling the swelling configuration.

By the term "swelling st ate" as used in the present invention is meant a state in which the Prepolymer as the starting material for the reaction is expanded in volume or weight more than the thermal swelling value within the range of the reaction conditions described hereunder, and a swelling solvent signifies a single compound or a mixture thereof which has a boiling point at which it completely vaporize or has a vapor pressure of usually not less than 50 mm Hg, preferably not less than 200 mm Hg under the following reaction conditions and which can form the above-mentioned swelling st ate.

Such swelling solvent is not specifically limited provided that it satisfies the foregoing swelling conditions. For example, an aromatic compound or an oxygen-containing compound which has a solubility parameter in the range of 4 to 20 (cal/cm$^3$)$^{1/2}$, preferably 7 to 14 (cal/cm$^3$)$^{1/2}$ falls under the category thereof. Examples of solvents that are not to be used as a swelling solvent include a solvent having a functional group of relatively high hydrogen bondability such as hydroxyl group, carboxyl group, amino group, amide group, cyano group and nitro group, since they possibly participate in the transesterification under the temperature condition of higher than 150° C. In addition, a halogen-containing solvent is unfavorable from the environmental point of view.

Specific examples of swelling solvents include an aromatic hydrocarbon such as benzene, toluene, xylene, ethylbenzene, diethylbenzene, propylbenzene and dipropylbenzene; an ether such as tetrahydrofuran and dioxane; and a ketone such as methyl ethyl ketone and methyl isobutyl ketone. Of these, an aromatic hydrocarbon having 6 to 20 carbon atoms alone or in the form of a mixture with other one is preferable.

Examples of the preferable poor solvent which satisfies the requirement that the solubility of a polycarbonate therein under the following reaction conditions is at most 0.1% by weight and the participation in the reaction is less possible, include a straight-chain or branched saturated hydrocarbon compound having 4 to 18 carbon atoms, and a limitedly unsaturated hydrocarbon compound having 4 to 18 carbon atoms. A swelling solvent and poor solvent each having a boiling point higher than 250° C. unfavorably make it difficult to remove the residual solvents, thus deteriorating the quality of the objective product.

In the case where the mixture of a poor solvent and a swelling solvent is used, the swelling solvent is contained in the mixed solvent in a proportion of preferably at least 1%, more preferably at least 5% by weight.

In the swelling solid phase polymerization, the reaction temperature is preferably 100 to 240° C., more preferably 150 to 220° C., and the pressure at the time of the reaction is preferably 10 Torr to 5 kg/cm$^2$G, particularly preferably atmospheric pressure. A reaction temperature lower than the aforesaid temperature range results in failure to proceed with the transesterification, whereas a high reaction temperature exceeding the melting point of the Prepolymer results in failure to keep a state of a solid phase, thereby causing the phenomenon of fusing adhesion among the Prepolymer particles and remarkably deteriorating the running operability. In view of the foregoing, the reaction temperature needs to be not higher than the melting point of the Prepolymer.

A quaternary phosphonium salt and, when necessary, another catalyst are used as a reaction catalyst in the swelling solid phase polymerization. The catalyst which was added in the step of producing the Prepolymer and remains in the step may be used as such or after being brought into the form of powder, liquid or gas. It is also possible according to demand to improve the quality of the objective polycarbonate by adding the above-mentioned terminal stopper or antioxidant in the form of powder, liquid or gas. As the terminal stopper and antioxidnat that are usable in the polymerization, mention is made of the species as described in the aforesaid first to third aspects of the present invention.

The swelling solvent may be fed in a liquid state to the reactor and vaporized therein, or vaporized in advance with a heat exchanger or the like and thereafter fed to the reactor. The flow direction of the swelling solvent vapor may be vertical, that is, upward or downward, or horizontal provided that the atmospheric gas of the Prepolymer can be replaced therewith. The reactor may be equipped with one or at least two feed inlets, depending on the type thereof, and it is possible to combine the flow dirrections and limit the portion through which the vapor flows.

The flow velocity of the swelling solvent vapor is not lower than $1 \times 10^{-3}$ cm/s, preferably not lower than $1 \times 10^{-3}$ cm/s and the vapor is preferably fed to the reactor at a feed rate of at least 0.5 liter under standard condition/hr per one gram of the Prepolymer. The flow rate of the swelling solvent vapor is closely related to the reaction rate. The solvent itself exhibits the effect on the removal of the monohydroxyl compounds and carbonic acid diesters and functions as a heating medium, and accordingly, the reaction rate enhances with an increase in the vapor flow rate. Moreover, the effect of the vapor as a heating medium can decrease the difference in temperature between the heat transfer portion such as a jecket and the internal powder, thereby preventing the fusing adhesion of the powder and the like in the heat transfer portion.

The reactor to be used in such swelling solid phase polymerization is not specifically limited, but is exemplified, as a usable type, by stirred tank type, tumbling type, kiln type, paddle dryer type, screw conveyor type, vibrating type, fluidized bed type, fixed bed type and moving bed type. The reactor may be used alone or in combination with other one.

The above-mentioned swelling solvent vapor or the mixture of a swelling solvent vapor and a poor solvent vapor may be incorporated, as required, with an inert gas without specific limitation, which is exemplified by nitrogen, carbon dioxide, argon, helium and saturated or unsaturated lower hydrocarbons such as methane, ethane, propane, ethylene and propylene. The gas exemplified above may be used alone or as a combination of at least two components.

With regard to the mixing ratio of the inert gas to the swelling solvent vapor, the swelling solvent vapor is contained in the mixed gas in a proportion of at least 1% by volume, preferably at least 5% by volume.

According to the above-described swelling solid phase polymerization method, the reaction rate in this method is higher than that of the conventional melting transesterification method in spite of its lower reaction temperature, whereby the reaction time can easily be shortened to one half or less as compared with the above transesterification method, and besides a polycarbonate having excellent quality and viscosity-average molecular weight of about 100,000 can be produced with ease.

With regard to the steps of drying and pelletizing the polycarbonate thus increased in its molecular weight, the conventional method is applicable thereto without specific limitation. In the case of mixing an additive in the polycarbonate according to the desire, it is preferable to directly coat the polycarbonate increased in its molecular weight with the powdery additive before or after drying, or spray the additive in liquid form so that the vapor is absorbed in the polymer. However, the additive can be mixed therein by means of an extruder at the time of pelletizing.

The polycarbonate which is obtained by the method according to the present invention, that is, by the method according to any of the first to fourth aspects of the present invention may be incorporated for commercial use with a well-known additive such as a plasticizer, pigment, lubricant, releasing agent, stabilizer or inorganic filler.

It is possible to blend the polycarbonate with a polymer such as polyolefin, polystyrene, polyester, polysulfonate, polyamide, polyphenylene ether or the like. In particular, it is effective to use the polycarbonate in combination with a polymer having an OH group, COOH group, NH$_2$ group or the like at the terminal thereof, such as polyphenylene ether, polyether nitrile, terminal-modified polysiloxane compound, modified polypropylene, modified polystyrene or the like.

According to the present invention, by the use of the specific polymerization catalyst in the production of polycarbonate through the transesterification, it is made possible to sufficiently enhance the catalyst activity and the reaction rate, remove the catalyst from the reactants by thermal decomposition thereof in the final stage of the reaction and efficiently produce a polycarbonate which is excellent in heat resistance, hydrolysis resistance and the like and has favorable color tone and high quality.

Furtheremore, by polymerizing a Prepolymer in a state of a solid phase in the presence of the specific catalyst which Prepolymer has been produced in the preliminary polymerization, it is made possible to proceed with the polymerization at a relatively low temperature, enhance the reaction rate and efficiently produce a polycarbonate which is excellent in heat resistance, hydrolysis resistance and the like and has favorable color tone and high quality.

The polycarbonate obtained in the above-mentioned way is a polycarbonate which is excellent in hydrolysis resistance such that the rate of decrease in molecular weight ($\Delta M/Mo \times 100\%$ wherein Mo is initial molecular weight and $\Delta M$ is decrease in molecular weight) is 10% or less, when subjected to steam resistance test, for example, a test in which a polycarbonate sample is exposed to steam at 121° C. for 48 hours and then a decrease in viscosity-average molecular weight is determined.

In the following, the present invention will be described in more detail with reference to working examples, which however shall not be construed to limit the invention thereto.

EXAMPLE 1

A 100 mL (milliliter) autoclave made of nickel steel and equipped with a stirrer was charged with 22.8 g (0.1 mol) of bisphenol A (BPA), 23.5 g (0.11 mol) of diphenyl carbonate and the catalysts whose kinds and amounts are given in Table 1, and then the atmosphere in the autoclave was replaced with argon five times. The resultant mixture was heated to 180° C. and reacted for 30 minutes in an atmosphere of argon. Subsequently the mixture was heated to 210° C. and reacted for 30 minutes, while the vacuum was gradually enhanced to 100 mm Hg; further heated to 240° C. and reacted for 30 minutes, while the vacuum was gradually enhanced to 10 mm Hg; then heated to 270° C. and reacted for 30 minutes, while the vacuum was enhanced to 2 mm Hg; and subsequently reacted for 30 minutes at a vacuum of 0.3 mm Hg to complete the reaction.

Thereafter, a measurement was made of the viscosity-average molecular weight of the viscous transparent condensate (polycarbonate) in the autoclave. The condesate was press formed to form into a plate of 1 mm thickness and 10 mm diameter, which was exposed to steam at 121° C. for 48 hours and tested for appearance and decrease in viscosity-average molecular weight to evaluate the hydrolysis resistance of the resultant polymer. The results are given in Table 2.

The viscosity-average molecular weight Mv was calculated by the formula $[\eta]=1.23\times10^{-5}\times Mv^{0.83}$ wherein $[\eta]$ is the intrinsic viscosity in methylene chloride at 20° C.

EXAMPLES 2 TO 6 AND COMPARATIVE EXAMPLES 1 TO 3

The procedure in Example 1 was repeated to prepare polycarbonates and evaluate the same except that the catalysts the kinds and amounts of which are given in Table 1 were used. The results are given in Table 2.

EXAMPLES 7 TO 12 AND COMPARATIVE EXAMPLES 4 TO 6

The procedure in Example 1 was repeated to prepare polycarbonates and evaluate the same except that the catalysts the kinds and amounts of which are given in Table 1 were used, and that in the final stage of the reaction under 0.3 mm Hg vacuum, the reaction temperature was set to 290° C. instead of 270° C. The results are given in Table 2.

EXAMPLES 13 to 14

The procedure in Example 1 was repeated to prepare polycarbonates and evaluate the same except that the catalysts the kinds and amounts of which are given in Table 1 were used, and that, after the reaction at 270° C. under 0.3 mm Hg vacuum for 30 minutes, heat treatment was further carried out at 290° C. under 0.3 mm Hg vacuum for 10 minutes. The results are given in Table 2.

TABLE 1

| | | Polymerization catalyst | | |
|---|---|---|---|---|
| | | Nitrogen-containing organic basic compound | | Quaternary phosphomium salt, etc. |
| | Kind | Use amount (mol/mol BPA) | Kind | Use amount (mol/mol BPA) |
| Example | 1 TMAH | $2.5 \times 10^{-4}$ | TPTB | $1 \times 10^{-5}$ |
| | 2 TMAH | $2.5 \times 10^{-4}$ | TPTB | $1 \times 10^{-6}$ |
| | 3 TMAH | $2.5 \times 10^{-4}$ | TBPH | $1 \times 10^{-5}$ |
| | 4 TMAH | $2.5 \times 10^{-4}$ | MTPTB | $1 \times 10^{-5}$ |
| | 5 TBAH | $2.5 \times 10^{-4}$ | TPTB | $1 \times 10^{-5}$ |
| | 6 TBAB | $2.5 \times 10^{-4}$ | TPTB | $1 \times 10^{-5}$ |
| Comparative Example | 1 TMAH | $2.5 \times 10^{-4}$ | — | — |
| | 2 TMAH | $2.5 \times 10^{-4}$ | NaOH | $1 \times 10^{-6}$ |
| | 3 — | — | TPTB | $1 \times 10^{-5}$ |
| Example | 7 TMAH | $2.5 \times 10^{-4}$ | BPTB | $1 \times 10^{-5}$ |
| | 8 TMAH | $2.5 \times 10^{-4}$ | POPTB | $1 \times 10^{-5}$ |
| | 9 TMAH | $2.5 \times 10^{-4}$ | MOPTB | $1 \times 10^{-5}$ |
| | 10 TMAH | $2.5 \times 10^{-4}$ | BPPO | $1 \times 10^{-5}$ |
| | 11 TMAH | $2.5 \times 10^{-4}$ | POPPO | $1 \times 10^{-5}$ |
| | 12 TMAH | $2.5 \times 10^{-4}$ | MOPPO | $1 \times 10^{-5}$ |
| Comparative Example | 4 TMAH | $2.5 \times 10^{-4}$ | — | — |
| | 5 TMAH | $2.5 \times 10^{-4}$ | NaOH | $1 \times 10^{-6}$ |
| | 6 — | — | TPTB | $1 \times 10^{-5}$ |
| Example | 13 TMAH | $2.5 \times 10^{-4}$ | TPTB | $1 \times 10^{-5}$ |
| | 14 TMAH | $2.5 \times 10^{-4}$ | BPTB | $1 \times 10^{-5}$ |

(Remarks)
TMAH: tetramethylammonium hydroxide (Na<1 ppb, Ca<1 ppb, K<1 ppb)
TBAH: tetrabutylammonium hydroxide (Na<5 ppm, K<10 ppm)
TBAB: tetrabutylammonium hydroxide (Na<50 ppm)
TPTB: tetraphenylphosphonium tetraphenylborate (Na<1 ppm, Mg<1 ppm)
MTPTB: methyltriphenylphosphonium tetraphenylborate (Na<7 ppm, Mg<5 ppm)
TBPH: tetrabutylphosphonium hydroxide (Na<40 ppm, K<5 ppm)
BPTB: biphenyltriphenylphosphonium tetraphenylborate (Na<1 ppm, Ca<1 ppm, K<1 ppm)
POPTB: phenoxyphenyltriphenylphosphonium tetraphenylborate (Na<1 ppm, Ca<1 ppm, K<1 ppm)
MOPTB: methoxyphenyltriphenylphosphonium tetraphenylborate (Na<1 ppm, Mg<1 ppm)
BPPO: biphenyltriphenylphosphonium phenoxide (Na<1 ppm, Ca<1 ppm, K<1 ppm)
POPPO: phenoxyphenyltriphenylphosphonium phenoxide (Na<1 ppm, Ca<1 ppm, K<1 ppm)
MOPPO: methoxyphenyltriphenylphosphonium phenoxide (Na<1 ppm, Ca<1 ppm, K<1 ppm)

TABLE 2

| | | Polycarbonate | | |
|---|---|---|---|---|
| | | Viscosity-average | Steam resistance | |
| | | molecular weight [Mv] | Appearance | Molecular weight decrease [ΔMv] |
| Example | 1 | 19100 | transparent | 1200 |
| | 2 | 16100 | transparent | 1000 |
| | 3 | 18100 | transparent | 1800 |
| | 4 | 17000 | transparent | 600 |
| | 5 | 18900 | transparent | 1800 |
| | 6 | 19900 | transparent | 1800 |
| Comparative Example | 1 | 4800 | — | — |
| | 2 | 18000 | transparent | 2800 |
| | 3 | 6600 | — | — |
| Example | 7 | 21500 | transparent | 300 |
| | 8 | 21000 | transparent | 400 |
| | 9 | 19000 | transparent | 500 |
| | 10 | 20500 | transparent | 400 |
| | 11 | 20500 | transparent | 500 |

TABLE 2-continued

|  |  | Polycarbonate | | |
|---|---|---|---|---|
|  |  | Viscosity-average molecular weight [Mv] | Steam resistance Appearance | Molecular weight decrease [ΔMv] |
|  | 12 | 19500 | transparent | 600 |
| Comparative Example | 4 | 4800 | — | — |
|  | 5 | 20000 | transparent | 2900 |
|  | 6 | 6700 | transparent | — |
| Example | 13 | 21500 | transparent | 300 |
|  | 14 | 20500 | transparent | 300 |

EXAMPLE 15

A 100 mL (milliliter) autoclave made of nickel steel and equipped with a stirrer was charged with 22.8 g (0.1 mol) of bisphenol A (BPA), 23.5 g (0.11 mol) of diphenyl carbonate and the catalysts whose kinds and amounts are given in Table 3, and then the atmosphere in the autoclave was replaced with nitrogen five times. The resultant mixture was heated to 180° C. and reacted for 30 minutes in an atmosphere of argon. Subsequently the mixture was heated to 210° C. and reacted for 30 minutes, while the vacuum was gradually enhanced to 100 mm Hg; further heated to 240° C. and reacted for 30 minutes, while the vacuum was gradually enhanced to 10 mm Hg; then heated to 270° C. and reacted for 30 minutes, while the vacuum was enhanced to 2 mm Hg; and subsequently reacted at 290° C. for 30 minutes at a vacuum of 0.3 mm Hg to complete the reaction.

Then measurements were made of the viscosity-average molecular weight and the steam resistance of the polycarbonate thus obtained in the same manner as Example 1. The results are given in Table 3

EXAMPLES 16 TO 20 AND COMPARATIVE EXAMPLES 7 TO 10

The procedure in Example 15 was repeated to prepare polycarbonates and evaluate the same except that the catalysts the kinds and amounts of which are given in Table 3 were used. The results are given in Table 3.

TABLE 3

|  |  | Polymerization catalyst | | Polycarbonate | | |
|---|---|---|---|---|---|---|
|  |  | Kind | Use amount (mol/mol BPA) | Viscosity-average molecular weight [Mv] | Hydrolysis resistance Appearance | [ΔMv] |
| Example | 15 | BPTB | 1 × 10⁻⁴ | 19000 | transparent | 900 |
|  | 16 | BPPO | 1 × 10⁻⁴ | 18800 | transparent | 700 |
|  | 17 | POPTB | 1 × 10⁻⁴ | 18500 | transparent | 700 |
|  | 18 | MOPTB | 1 × 10⁻⁴ | 17000 | transparent | 600 |
|  | 19 | POPPO | 1 × 10⁻⁴ | 18400 | transparent | 800 |
|  | 20 | MOPPO | 1 × 10⁻⁴ | 17100 | transparent | 700 |
| Comparative Example | 7 | — | — | 4800 | — | — |
|  | 8 | NaOH | 1 × 10⁻⁵ | 19300 | white turbidity | 6,600 |
|  | 9 | TPTB | 1 × 10⁻⁴ | 10500 | white spot | 1,800 |
|  | 10 | MTPTB | 1 × 10⁻⁴ | 8500 | — | — |

(Remarks)
BPTB: biphenyltriphenylphosphonium tetraphenylborate (Na, Ca, K<1 ppm)
BPPO: biphenyltriphenylphosphonium phenolate (Na, Ca, K<1 ppm)
POPTB: phenoxyphenyltriphenylphosphonium tetraphenylborate (Na, Ca, K<1 ppm)
MOPTB: methoxyphenyltriphenylphosphonium tetraphenylborate (Na, Ca, K<1 ppm)
POPPO: phenoxyphenyltriphenylphosphonium phenolate (Na, Ca, K<1 ppm)
MOPPO: methoxyphenyltriphenylphosphonium phenolate (Na, Ca, K<1 ppm)
TPTB: tetraphenylphosphonium tetraphenylborate (Na, Ca, K<1 ppm)
MTPTB: methyltriphenylphosphonium tetraphenylborate (Na<7 ppm, Mg<1 ppm)

EXAMPLE 21

A 100 mL (milliliter) autoclave made of nickel steel and equipped with a stirrer was charged with 22.8 g (0.1 mol) of bisphenol A (BPA), 23.5 g (0.11 mol) of diphenyl carbonate and the catalysts whose kinds and amounts are given in Table 3, and then the atmosphere in the autoclave was replaced with nitrogen five times. The resultant mixture was heated to 180° C. and reacted for 30 minutes in an atmosphere of argon. Subsequently the mixture was heated to 210° C. and reacted for 30 minutes, while the vacuum was gradually enhanced to 100 mm Hg; further heated to 240° C. and reacted for 30 minutes, while the vacuum was gradually enhanced to 10 mm Hg; reacted for 30 minutes, while the vacuum was enhanced to 2 mm Hg; then heated to 260° C. and reacted for 30 minutes; and subsequently heated to 270° C. and reacted for 30 minutes, while the vacuum was enhanced to 0.3 mm Hg to complete the reaction.

Then measurements were made of the viscosity-average molecular weight and the steam resistance of the polycarbonate thus obtained in the same manner as Example 1.

Further, the molding having the same shape as used in the steam resistance test was heated at 340° C. for 1.5 hour in a stream of nitrogen gas, dissolved in methylene chloride so as to attain a concentration of 8% by weight, and measured for YI (yellow index) with a color meter SM-3 (produced by Suga Test Instrument Co., Ltd.) by the use of a quartz cell having an optical path length of 57 mm to evaluate the retention burn resistance. These results are given in Table 5.

EXAMPLES 22 TO 25 AND COMPARATIVE EXAMPLES 11 & 12

The procedure in Example 21 was repeated to prepare polycarbonates and evaluate the same except that the catalysts the kinds and amounts of which are given in Table 4 were used. The results are given in Table 5.

EXAMPLES 26 & 27

The procedure in Example 21 was repeated to prepare polycarbonates and evaluate the same except that the catalysts the kinds and amounts of which are given in Table 4 were used, and that, after heated to 240° C. and reacted for 30 minutes, while the vacuum was gradually enhanced to 10 mm Hg, the mixture was heated to 270° C. and reacted for 30 minutes, while the vacuum was enhanced to 2 mm Hg, subsequently heated to 290° C. and reacted for 30 minutes, while the vacuum was enhanced to 0.5 mm Hg. The results are given in Table 5.

TABLE 4

| | | Polymerization catalyst | | |
|---|---|---|---|---|
| | | Quaternary phoshonium salt containing branched alkyl gruop. etc. | | Nitrogen-containing organic basic compound |
| | | Kind | Use amount (mol/mol BPA) | Kind | Use amount (mol/mol BPA) |
| Example | 21 | HPTB | $2.5 \times 10^{-4}$ | — | — |
| | 22 | PPTB | $2.5 \times 10^{-4}$ | — | — |
| | 23 | HPTB | $5 \times 10^{-5}$ | TMAH | $2.5 \times 10^{-4}$ |
| | 24 | PPTB | $5 \times 10^{-5}$ | TMAH | $2.5 \times 10^{-4}$ |
| | 25 | IPPB | $5 \times 10^{-5}$ | TMAH | $2.5 \times 10^{-4}$ |
| | 26 | PPPP | $5 \times 10^{-5}$ | TMAH | $2.5 \times 10^{-4}$ |
| | 27 | HPPP | $5 \times 10^{-5}$ | TMAH | $2.5 \times 10^{-4}$ |
| Comparative | 11 | — | — | TMAH | $2.5 \times 10^{-4}$ |
| Example | 12 | NaOH | $1 \times 10^{-6}$ | TMAH | $2.5 \times 10^{-4}$ |

(Remarks)
HPTB: cyclohexyltriphenylphosphonium tetraphenylborate (Na<10 ppm, Mg<10 ppm, Ca<10 ppm, K<10 ppm)
PPTB: cyclopentyltriphenylphosphonium tetraphenylborate (Na<10 ppm, Mg<10 ppm, Ca<10 ppm, K<10 ppm)
IPPB: isopropyltriphenylphosphonium tetraphenylborate (Na<10 ppm, Mg<10 ppm, Ca<10 ppm, K<10 ppm)
PPPP: cyclopentyltriphenylphosphonium phenolate (Na<10 ppm, Mg<10 ppm, Ca<10 ppm, K<10 ppm)
HPPP: cyclohexyltriphenylphosphonium phenolate (Na<10 ppm, Mg<10 ppm, Ca<10 ppm, K<10 ppm)
tetramethylammonium hydroxide (Na<1 ppb, Ca<1 ppb, K<1 ppb)

TABLE 5

| | | Polycarbonate | | | |
|---|---|---|---|---|---|
| | | Viscosity-average molecular | Steam resistance | | Retention burn resistance |
| | | weight [Mv] | Appearance | [ΔMv] | [YI(Sol.)] |
| Example | 21 | 18100 | transparent | 200 | 6.6 |
| | 22 | 17800 | transparent | 300 | 9.9 |
| | 23 | 15100 | transparent | 100 | 8.4 |
| | 24 | 15900 | transparent | 200 | 8.1 |
| | 25 | 15000 | transparent | 200 | 8.5 |
| | 26 | 18800 | transparent | 300 | 9.0 |
| | 27 | 19200 | transparent | 200 | 8.9 |
| Comparative | 11 | 5400 | — | — | 8.0 |
| Eample | 12 | 18600 | transparent | 2800 | 22.5 |

EXAMPLE 28

A 1 L (liter) autoclave made of nickel steel and equipped with a stirrer was charged with 228 g (1.0 mol) of bisphenol A (BPA), 225 g (1.05 mol) of diphenyl carbonate, 0.5 mmol of tetramethylammonium hydroxide and 0.01 mmol of tetraphenylphosphonium tetraphenylborate, and then the atmosphere in the autoclave was replaced with agron five times. The resultant mixture was heated to 190° C. and reacted for 30 minutes in an atmosphere of argon. Subsequently the mixture was gradually heated to raise the temperature to 235° C. and reacted for 60 minutes, while the vacuum was enhanced to 60 mm Hg; further gradually heated to raise the temperature to 270° C. and reacted for 120 minutes, while the vacuum was enhanced to 10 mm Hg; then heated at 270° C. and reacted for 30 minutes, while the vacuum was enhanced to 1 mm Hg; and subsequently reacted for 30 minutes, while the vacuum was enhanced to 0.5 mm Hg. After the completion of the reaction, the pressure in the reactor was returned to atmospheric pressure by using argon, and the Prepolymer as the content was taken out therefrom and crushed.

The Prepolymer had a number-average molecular weight (caluculated from $^1$H-NMR) of 3000 and a terminal fraction of hydroxy group terminal being 49 mol %.

The Prepolymer thus obtained was dissolved in methylene chloride, precipitated as powder by adding n-heptane, then concentrated, dried to bone dryness and vacuum dried to form powdery Prepolymer. The Prepolymer in an amount of 3 g was fed in a stainless steel pipe with 100 mm diameter and 200 mm length, and nitrogen was passed therethrough at 220° C. at a rate of 100 mL/minute to proceed with solid phase polymerization for 3 hours in the presence of the tetraphenylphosphonium tetraphenylborate as the catalyst which was the residue after the synthetic reaction of the Prepolymer to produce objective polycarbonate.

The polycarbonate thus obtained was press formed into a plate of 1 mm thickness and 10 mm diameter, which was exposed to steam at 121° C. for 48 hours and tested for appearance and decrease in viscosity-average molecular weight (ΔMv) thereof to evaluate the steam resistance of the resultant polymer. The results are given in Table 6.

EXAMPLES 29 TO 33 AND COMPARATIVE EXAMPLES 13 to 15

A 1 L (liter) autoclave made of nickel steel and equipped with a stirrer was charged with 228 g (1.0 mol) of bisphenol A (BPA), 225 g (1.05 mol) of diphenyl carbonate, and 0.5 mmol of tetramethylammonium hydroxide and then the atmosphere in the autoclave was replaced with argon five times. The resultant mixture was heated to 190° C. and reacted for 30 minutes in an atmosphere of argon. Subsequently the mixture was gradually heated to raise the temperature to 235° C. and reacted for 60 minutes, while the vacuum was enhanced to 60 mm Hg; further gradually heated to raise the temperature to 270° C. and reacted for 120 minutes, while the vacuum was enhanced to 10 mm Hg; then heated at 270° C. and reacted for 60 minutes, while the vacuum was enhanced to 1 mm Hg; and subsequently reacted for 60 minutes, while the vacuum was enhanced to 0.5 mm Hg. After the completion of the reaction, the pressure in the reactor was returned to atmospheric pressure by using argon, and the Prepolymer as the content was taken out therefrom and crushed.

The Prepolymer had a number-average molecular weight (calculated from $^1$H-NMR) of 3330 and a terminal fraction of hydroxy group terminal being 48 mol %.

The Prepolymer thus obtained was dissolved in methylene chloride, incorporated with the catalysts as shown in Table 6, then precipitated as powder by adding n-heptane, then concentrated, dried to bone dryness and vacuum dried to form powdery Prepolymer. The Prepolymer in an amount of 3 g was fed in a stainless steel pipe with 10 mm diameter and 200 mm length, and nitrogen was passed therethrough at 220° C. at a rate of 100 mL/minute to proceed with solid phase polymerization for 3 hours in the presence of the above catalyst to produce objective polycarbonate.

The polycarbonate thus obtained was press formed and evaluated for the steam resistance in the same manner as in Example 28. The results are given in Table 6.

The viscosity-average molecular weight Mv was calculated by the formula $[\eta]=1.23\times10^{-5}\times Mv^{0.83}$ wherein $[\eta]$ is the intrinsic viscosity in methylene chloride at 20° C.

TABLE 6

| | | Polymerization catalyst | | Viscosity-average | Steam resistance |
|---|---|---|---|---|---|
| | | Kind | Use amount (mol/mol BPA) | molecular weight [Mv] | [ΔMv] |
| Example | 28 | TPTB | — | 18900 | 300 |
| | 29 | TPTB | $1.0 \times 10^{-5}$ | 18000 | 300 |
| | 30 | HPTB | $1.0 \times 10^{-5}$ | 21500 | 200 |
| | 31 | BPTB | $1.0 \times 10^{-5}$ | 17800 | 300 |
| | 32 | TPPH | $1.0 \times 10^{-5}$ | 18100 | 400 |
| | 33 | TPPO | $1.0 \times 10^{-5}$ | 20500 | 400 |
| Comparative | 13 | — | — | 4800 | — |
| Example | 14 | NaOH | $1.0 \times 10^{-6}$ | 18000 | 2800 |
| | 15 | TMAH | $1.0 \times 10^{-5}$ | 5800 | — |

(Remarks)
TPTB: tetraphenylphosphonium tetraphenylborate
HPTB: cyclohexyltriphenylphosphonium tetraphenylborate
BPTB: biphenyltriphenylphosphonium tetraphenylborate
TPPH: tetraphenylphosphonium hydroxide
TPPO: tetraphenylphosphonium phenolate
TMAH: tetramethyllammonium hydroxide

EXAMPLE 34

A 1 L (liter) autoclave made of nickel steel and equipped with a stirrer was charged with 228 g (1.0 mol) of bisphenol A (BPA), 225 g (1.05 mol) of diphenyl carbonate, and the catalyst A as shown in Table 7, and then the atmosphere in the autoclave was replaced with argon five times. The resultant mixture was heated to 190° C. and reacted for 30 minutes in an atmosphere of argon. Subsequently the mixture was gradually heated to raise the temperature to 235° C. and reacted for 60 minutes, while the vacuum was enhanced to 60 mm Hg; further gradually heated to raise the temperature to 270° C. and reacted for 120 minutes, while the vacuum was enhanced to 10 mm Hg; then heated at 270° C. and reacted for 30 minutes, while the vacuum was enhanced to 1 mm Hg, and subsequently reacted for 30 minutes, while the vacuum was enhanced to 0.5 mm Hg. After the completion of the reaction, the pressure in the reactor was returned to atmospheric pressure by using argon, and the Prepolymer as the content was taken out therefrom and crushed.

The Prepolymer thus obtained was dissolved in methylene chloride, incorporated with the catalyst B as shown in Table 7, then precipitated as powder by adding n-heptane, then concentrated, dried to bone dryness and vacuum dried to form powdery Prepolymer. The Prepolymer in an amount of 3 g was fed in a stainless steel pipe with 10 mm diameter and 200 mm length, and the gas as shown in Table 7 was passed therethrough at 220° C. at a rate of 100 ml/minute to proceed with solid phase polymerization for 1.5 hour in the presence of the above catalyst to produce objective polycarbonate.

The polycarbonate thus obtained was press formed and evaluated for the steam resistance in the same manner as in Example 28. The results are given in Table 6.

EXAMPLES 35 TO 41 AND COMPARATIVE EXAMPLE 16 to 18

The procedure in Example 34 was repeated except that the reaction time at 270° C. under 1 mm Hg vacuum and the reaction time at 270° C. under 0.5 mm Hg vacuum were each set to 60 minutes instead of 30 minutes. The results are given in Table 7.

EXAMPLE 42

In a 50 L vessel equipped with a stirrer were placed 9.2 mol of bisphenol A as dihydric phenol, 9.4 L of 2.0N aqueous solution of sodium hydroxide and 8 L of methylene chloride under stirring, and phosgene was blown into the resultant mixture for 30 minutes as a sufficiently excess amount.

Subsequently, the content in the vessel was reacted with 0.18 mol of phenol and incorporated with 0.4 mol of bisphenol A, 0.022 mol of trimethylamine and 4.5 L of 0.2N aqueous solution of sodium hydroxide to react for 40 minutes, and the water phase was separated from the organic phase to produce a solution of polycarbonate oligomer (PC oligomer) in methylene chloride.

Subsequently, 8 L of the PC oligomer solutuion, 2.5 mol of bisphenol A, 0.18 mol of methyl chloroformate, 400 g of 7.25% by weight of aqueous solution of sodium hydroxide, 0.017 mol of trimethylamine and 8 L of methylene chloride were mixed under stirring at 500 r.p.m. to proceed with reaction for 60 hours.

After the completion of the reaction, the water phase was separated from the organic phase, which was washed successively with water, alkali (0.01N aqueous solution of sodium hydroxide), acid (0.1 hydrochloric acid) and pure water to produce a solution of PC prepolymer in the organic solvent. The methylene chloride was removed from a part of the prepolymer to produce powdery prepolymer, and a measurement was made of the viscosity-average molecular weight thereof with the result that it was 8,700.

From the solution of the prepolymer in the organic solvent thus obtained, methylene chloride was removed by evaporation to produce powdery prepolymer.

Thereafter, the procedure in Example 31 was repeated to produce a polycarbonate except that the prepolymer thus obtained was used. Subsequently, the polycarbonate thus obtained was press formed and evaluated for steam resistance in the same manner as in Example 28. The results are given in Table 7.

TABLE 7-1

| | | Polymerization catalyst A | | Polymerization catalyst B | |
|---|---|---|---|---|---|
| | | Kind | Use amount (mol/mol BPA) | Kind | Use amount (mol/mol BPA) |
| Example | 34 | TMAH | $2.5 \times 10^{-4}$ | — | — |
| | | TPTB | $1.0 \times 10^{-5}$ | | |
| | 35 | TMAH | $2.5 \times 10^{-4}$ | TPTB | $1.0 \times 10^{-5}$ |
| | 36 | TMAH | $2.5 \times 10^{-4}$ | HPTB | $1.0 \times 10^{-5}$ |
| | 37 | TMAH | $2.5 \times 10^{-4}$ | BPTB | $1.0 \times 10^{-5}$ |
| | 38 | TMAH | $2.5 \times 10^{-4}$ | TPPH | $1.0 \times 10^{-5}$ |
| | 39 | TMAH | $2.5 \times 10^{-4}$ | TPPO | $1.0 \times 10^{-5}$ |
| | 40 | TMAH | $2.5 \times 10^{-4}$ | HPTB | $1.0 \times 10^{-5}$ |
| | 41 | TMAH | $2.5 \times 10^{-4}$ | HPTB | $1.0 \times 10^{-5}$ |
| | 42 | — | — | TPTB | $1.0 \times 10^{-5}$ |
| Comparative | 16 | TMAH | $2.5 \times 10^{-4}$ | — | — |
| Example | 17 | TMAH | $2.5 \times 10^{-4}$ | NaOH | $1.0 \times 10^{-6}$ |
| | 18 | TMAH | $2.5 \times 10^{-4}$ | TMAH | $1.0 \times 10^{-5}$ |

(Remarks)
TPTB: tetraphenylphosphonium tetraphenylborate
HPTB: cyclohexyltriphenylphosphonium tetraphenylborate
BPTB: biphenyltriphenylphosphonium tetraphenylborate
TPPH: tetraphenylphosphonium hydroxide
TPPO: tetraphenylphosphonium phenolate
TMAH: tetramethylammonium hydroxide

TABLE 7-2

|  |  | Gas component [mixed gas volumetric satio 1/1] | Polycaobonate | | |
|---|---|---|---|---|---|
|  |  |  | Viscosity-average molecular weight [Mv] | Steam resistance | |
|  |  |  |  | Appearance | [ΔMv] |
| Example | 34 | p-xylene/n-heptane | 19000 | transparent | 300 |
|  | 35 | p-xylene/n-heptane | 18700 | transparent | 100 |
|  | 36 | p-xylene/n-heptane | 19500 | transparent | 100 |
|  | 37 | p-xylene/n-heptane | 18500 | transparent | 300 |
|  | 38 | p-xylene/n-heptane | 18800 | transparent | 200 |
|  | 39 | p-xylene/n-heptane | 19000 | transparent | 100 |
|  | 40 | p-xylene/nitrogen | 19300 | transparent | 100 |
|  | 41 | p-xylene | 18000 | transparent | 100 |
|  | 42 | p-xylene/n-heptane | 19000 | transparent | 100 |
| Comparative Example | 16 | p-xylene/n-heptane | 4800 | — | — |
|  | 17 | p-xylene/n-heptane | 20000 | transparent | 2800 |
|  | 18 | p-xylene/n-heptane | 5800 | — | — |

EXAMPLES 43 TO 46 AND COMPARATIVE EXAMPLES 19 to 21

A 1 L (liter) autoclave made of nickel steel and equipped with a stirrer was charged with 228 g (1.0 mol) of bisphenol A (BPA), 225 g (1.05 mol) of diphenyl carbonate, and 0.5 mmol of tetramethylammonium hydroxide and then the atmosphere in the autoclave was replaced with argon five times. The resultant mixture was heated to 190° C. and reacted for 30 minutes in an atmosphere of argon. Subsequently the mixture was gradually heated to raise the temperature to 235° C. and reacted for 60 minutes, while the vacuum was enhanced to 60 mm Hg; further gradually heated to raise the temperature to 270° C. and reacted for 120 minutes, while the vacuum was enhanced to 10 mm Hg; then heated at 270° C. and reacted for 60 minutes, while the vacuum was enhanced to 1 mm Hg; and subsequently reacted for 60 minutes, while the vacuum was enhanced to 0.5 mm Hg. After the completion of the reaction, the pressure in the reactor was returned to atmospheric pressure by using argon, and the Prepolymer as the content was taken out therefrom and crushed.

The Prepolymer had a number-average molecular weight (calculated from $^1$H-NMR) of 3330 and a terminal fraction of hydroxy group terminal being 48 mol %.

A large amount of the Prepolymer was prepared in the above-mentioned way, and dissolved in methylene chloride to prepare a solution of the Prepolymer in the organic solvent, which was incorporated with the catalysts as shown in Table 8 and thereafter formed into spherical Prepolymer by the method described hereunder.

The resultant powdery Prepolymer in an amount of 100 g was placed in advance in a 1 L stirred vessel equipped with a heating unit.

The stirred vessel was heated and the content therein was stirred at 250 r.p.m. When the powdery Prepolymer which had been fed in advance in the stirred vessel was heated to a temperature of 60° C., the aforesaid solution of the Prepolymer in the organic solvent was fed in the vessel at a rate of 1 L/hour and simultaneously, heptane was also fed in the vessel at a rate of 200 cc/hour to carry out granulation, while the internal temperature during the granulation was 60° C.

The Prepolymer granulated in the stirred vessel was consecutively taken out from the vessel to obtain 5 L (about 2.3 kg) of spherical Prepolymer having a bulk density of 0.46 g/cc.).

The spherical Prepolymer thus obtained had a sphericity as high as 0.89 expressed in terms of Wadell sphericity and an average particle diameter of 1.2 mm.

In addition, measurements were made of the angle of repose and discharge velocity for the spherical Prepolymer as the handling characteristics thereof.

Figure 2:
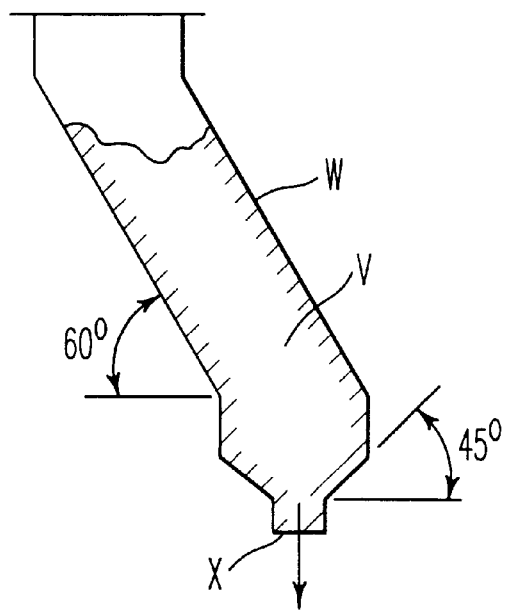

As a result, the angle of repose which was measured by a conventional method was 31 degrees. The discharge velocity was measured by means of a hopper as shown in FIG. 2. Specifically, 500 cc of the spherical Prepolymer was fed in an inclined cylindrical vessel W as shown in FIG. 2 which had 600 mm diameter and 500 mm overall length and composed of an inclined cylindrical portion V having 60 degree inclination, and a short vertical cylindrical portion whose upside is connected to the inclined cylindrical portion and whose underside is connected to a discharge wall having 45 degree slope and a discharge port X of 20 mm in diameter at the end thereof. Thus, the discharge velocity of the Prepolymer was measured. The result was 8.2 seconds expressed in terms of a period of time required for discharge.

The Prepolymer thus oftained in an amount of 3 g was fed in a stainless steel pipe with 10 mm diameter and 200 mm length, and nitrogen was passed therethrough at 220° C. and a rate of 100 mL/minutes to proceed with solid phase polymerization and produce objective polycarbonate for 2 hours in the presence of the catalysts as shown in Table 8.

The polycarbonate thus obtained was press formed and evaluated for steam resistance in the same manner as in Example 28. The results are given in Table 8.

TABLE 8

|  |  | Polymerization catalyst | | Viscosity-average molecular weight [Mv] | Steam resistance [ΔMv] |
|---|---|---|---|---|---|
|  |  | Kind | Use amount (mol/mol BPA) |  |  |
| Example | 43 | TPTB | $1.0 \times 10^{-5}$ | 19000 | 300 |
|  | 44 | HPTB | $1.0 \times 10^{-5}$ | 22000 | 200 |
|  | 45 | BPTB | $1.0 \times 10^{-5}$ | 17600 | 300 |
|  | 46 | TPPH | $1.0 \times 10^{-5}$ | 18000 | 500 |
| Comparative Example | 19 | — | — | 5100 | — |
|  | 20 | NaOH | $1.0 \times 10^{-6}$ | 18100 | 2800 |
|  | 21 | TMAH | $1.0 \times 10^{-5}$ | 6800 | — |

(Remarks)
TPTB: tetraphenylphosphonium tetraphenylborate
HPTB: cyclohexyltriphenylphosphonium tetraphenylborate
BPTB: biphenyltriphenylphosphonium tetraphenylborate
TPPH: tetraphenylphosphonium hydroxide
TMAH: tetramethyllammonium hydroxide

INDUSTRIAL APPLICABILITY

According to the process of the present invention, it is made possible to extremely efficiently produce high quality polycarbonate which is excellent in appearance, heat resistance, hydrolysis resistance and the like.

The polycarbonate obtained by the process according to the present invention is excellent in quality as mentioned above, and accordingly, is favorably used in the fields of electric/electronic machinery, automobile, optical part and other industries.

We claim:
1. A process for producing a polycarbonate comprising a transesterification in the presence of a polymerization catalyst which comprises a combination of (a) a nitrogen-containing organic basic compound and (b) a quaternary phosphonium salt wherein said quaternary phosphorium salt is selected from the group consisting of a compound represented by formula (II):

wherein $R^3$ is an organic group, four $R^3$ are the same or different from each other, or two $R^3$ combine with each other to form a ring; $X^2$ is a halogen atom, hydroxyl group, $(R^4O)_2P(=O)O$ in which $R^4$ is a hydrocarbon group, and two $R^4O$ are the same as or different from each other, $BR^5_4$ in which $R^5$ is a hydrogen atom or hydrocarbon group and four $R^5$ are the same or different from each other, $HCO_3$ or $CO_3$; and a is 2 in the case of $X^2$ being $CO_3$ and is 1 in the other cases; and a compound represented by formula (III):

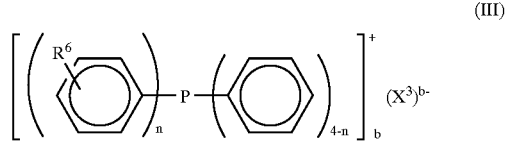

wherein $R^6$ is an organic group, and a plurality of $R^6$—Ph (Ph: phenyl group), when being present, are the same or different from each other; $X^3$ is a halogen atom, hydroxyl group, alkyloxy group, aryloxy group, alkylcarbonyloxy group, arylcarbonyloxy group, $BR^7_4$ in which $R^7$ is a hydrogen atom or hydrocarbon group and four $R^7$ are the same or different from each other, $HCO_3$ or $CO_3$; b is 2 in the case of $X_3$ being $CO_3$ and is 1 in the other cases; and n is an integer of 0 to 4.

2. The process for producing a polycarbonate according to claim 1 wherein the nitrogen-containing organic basic compound is a quaternary ammonium salt.

3. The process according to claim 1 wherein the nitrogen-containing organic basic compound is a quaternary ammonium salt or dimethylaminopyridine, said salt being represented by the general formula (I)

wherein $R^1$ is an organic group, four $R^1$ are the same or different from each other, or two $R^1$ combine with each other to form a ring; $X^1$ is a halogen atom, hydroxyl group, alkyloxy group, aryloxy group, alkylcarbonyloxy group, arylcarbonyloxy group, $HCO_3$, $CO_3$, or $BR^2_4$ in which $R^2$ is a hydrogen atom or hydrocarbon group and four $R^2$ are the same or different from each other; and z is 2 in the case of $X^1$ being $CO_3$ and is 1 in the other cases.

4. The process for producing a polycarbonate according to claim 1 wherein the component (a) is tetramethylammonium hydroxide and the component (b) is selected from the group consisting of tetraphenylphosphonium tetraphenylborate, tetraphenylphosphonium phenolate and tetraphenylphosphonium hydroxide.

5. The process for producing a polycarbonate according to claim 1 wherein the component (a) is tetramethylammonium hydroxide and the component (b) is at least one compound selected from the group consisting of biphenyltriphenylphosphonium tetraphenylborate,
phenoxyphenyltriphenylphosphonium tetraphenylborate,
methoxyphenyltriphenylphosphonium tetraphenylborate,
biphenyltriphenylphosphonium phenoxide,
phenoxyphenyltriphenylphosphonium phenoxide and
methoxyphenyltriphenylphosphonium phenoxide.

6. The process according to claim 1 wherein the quaternary phosphonium salt is a quaternary phosphonium salt containing a branched alkyl group.

7. The process according claim 6 wherein the quaternary phosphonium salt containing a branched alkyl group is a compound represented by the general formula (IV)

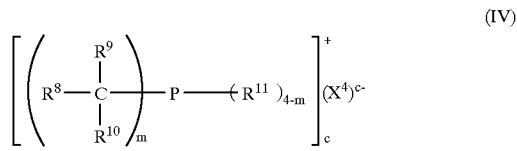

wherein $R^8$, $R^9$ and $R^{10}$ are each a hydrogen atom, alkyl group or aryl group, and are the same as or different from each other, or at least two of them combine with each other to form a ring, but two or three of them are not simultaneously a hydrogen atom, a plurality of $R^8R^9R^{10}C—$, when being present, are the same as or different from each other; $R^{11}$ is an alkyl group or aryl group and a plurality of $R^{11}$, when being present, are the same as or different from each other; $X^4$ is a halogen atom, hydroxyl group, alkyloxy group, aryloxy group, alkylcarbonyloxy group, arylcarbonyloxy group, $BR^{12}_4$ in which $R^{12}$ is a hydrogen atom or hydrocarbon group and four $R^{12}$ are the same as or different from each other, $HCO_3$ or $CO_3$; C is 2 in the case of $X^4$ being $CO_3$ and is 1 in the other cases; and m is an integer of 1 to 4.

8. The process according to claim 1 wherein the starting raw materials for the transesterification are (A) a dihydroxy compound and (B) a carbonic acid diester.

9. A process for producing a polycarbonate through transesterification which comprise using, as a polymerization catalyst, a quaternary phosphonium salt represented by the general formula (III):

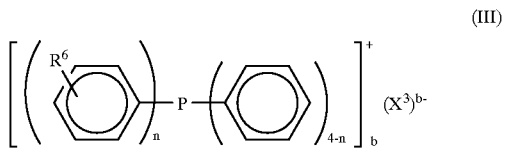

10. The process according to claim 9 wherein the quaternary phosphonium salt is at least one member selected from he group consisting of biphenyltriphenylphosphonium tetraphenylborate, biphenyltriphenylphosphonium phenoxide, phenoxyphenyltriphenylphosphonium tetraphenylborate, phenoxyphenyltriphenylphosphonium phenoxide, methoxyphenyltriphenylphosphonium tetraphenylborate and methoxyphenyltriphenylphosphonium phenoxide.

11. The process according to claim 9 wherein the starting raw materials for the transesterification are (A) a dihydroxy compound and (B) a carbonic acid diester.

12. A process for producing a polycarbonate through transesterification which comprises using, as a polymerization catalyst, a quaternary phosphonium salt containing a branched alkyl group.

13. The process according to claim 12 wherein the quaternary phosphonium salt containing a branched alkyl group is a compound represented by the general formula (IV):

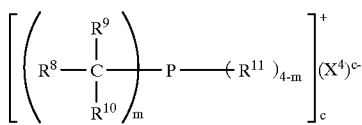

14. The process according to claim 12 wherein starting raw materials for the transesterification are (A) a dihydroxyl compound and (B) a carbonic acid diester.

15. A process for producing a polycarbonate which comprises the steps of preparing a polycarbonate prepolymer by preliminary polymerization and thereafter polymerizing said polycarbonate prepolymer in a state of a solid phase by the use of a quaternary phosphonium salt as a catalyst.

16. The process according to claim 15 wherein said polycarbonate prepolymer is prepared by subjecting a dihydroxy compound and a carbonic acid diester to transesterification.

17. The process according to claim 15 wherein said polycarbonate prepolymer is prepared by the use of a nitrogen-containing organic basic compound as a catalyst.

18. The process according to claim 15 wherein said polycarbonate prepolymer is prepared by subjecting a dihydroxy compound and phosgene to interfacial polycondensaion.

19. The process according to claim 15 wherein said polycarbonate prepolymer is polymerized in a state of a swelling solid phase in the presence of a quaternary phosphonium salt as a catalyst in an atmosphere of a gas selected from the group consisting of (a) a swelling solvent gas, (b) a mixed gas of a swelling solvent gas with a poor solvent gas, (c) a mixed gas of a swelling solvent gas with an inert gas and (d) a mixed gas of a swelling solvent gas with an inert gas and a poor solvent gas.

20. The process according to claim 15 wherein a granulated spherical polycarbonate prepolymer is polymerized in a state of a solid phase in the presence of a quaternary phosphonium salt as a catalyst, said prepolymer being granulated by feeding a solution of a polycarbonate prepolymer in an organic solvent to a granulating vessel containing a powdery polycarbonate prepolymer which has been stirred in advance, and evaporating said organic solvent while said solution of a polycarbonate prepolymer in said organic solvent is brought into contact with said powdery polycarbonate prepolymer.

21. The process for producing a polycarbonate according to claim 1 characterized in that the produced polycarbonate has a rate of decrease in molecular weight of at most 10% in a steam resistance test.

* * * * *